US010057383B2

(12) United States Patent
Shoaib et al.

(10) Patent No.: US 10,057,383 B2
(45) Date of Patent: Aug. 21, 2018

(54) SPARSITY ESTIMATION FOR DATA TRANSMISSION

(71) Applicant: Microsoft Technology Licensing, LLC, Redmond, WA (US)

(72) Inventors: Mohammed Shoaib, Redmond, WA (US); Jie Liu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 579 days.

(21) Appl. No.: 14/602,159

(22) Filed: Jan. 21, 2015

(65) Prior Publication Data
US 2016/0212245 A1  Jul. 21, 2016

(51) Int. Cl.
G06F 15/16 (2006.01)
H04L 29/06 (2006.01)
H04L 29/08 (2006.01)

(52) U.S. Cl.
CPC .............. *H04L 69/04* (2013.01); *H04L 67/12* (2013.01)

(58) Field of Classification Search
CPC ......... G06F 15/16; H04L 29/06; H04L 67/12; H04L 69/04
USPC .................... 709/246, 247; 341/60; 370/477; 382/232; 704/500; 708/203
See application file for complete search history.

(56) References Cited

U.S. PATENT DOCUMENTS

| | | | | |
|---|---|---|---|---|
| 7,432,843 B2* | 10/2008 | Brady | ...................... | G06T 9/00 341/120 |
| 8,055,095 B2* | 11/2011 | Palotai | ................ | G06K 9/0051 375/285 |
| 8,194,937 B2* | 6/2012 | Chen | .................... | G06T 11/006 382/118 |
| 8,483,492 B2* | 7/2013 | Baraniuk | .......... | G06K 9/00523 375/240 |

(Continued)

FOREIGN PATENT DOCUMENTS

CN 103517079 A 1/2014
WO WO2007050680 A2 5/2007

(Continued)

OTHER PUBLICATIONS

Candes et al., "A Probabilistic and RIPless Theory of Compressed Sensing", in the Proceedings of the IEEE Transactions on Information Theory, vol. 57, Iss. 11, Nov. 2011, 38 pages.

(Continued)

*Primary Examiner* — Davoud Zand
(74) *Attorney, Agent, or Firm* — Drinker Biddle & Reath LLP

(57) ABSTRACT

Disclosed herein are systems and methods for compressing data and for estimating sparsity of datasets to aid in compressing data. A device receives a plurality of samples of the sensor data from the sensor and determine a plurality of bits, in which each bit has a substantially equal probability of being determined as a 0 bit or of being determined as a 1 bit. The device estimates a sparsity value of the sensor data based at least in part on the sequence of bits. The device (Continued)

compresses the received samples of the sensor data based at least in part on the determined sparsity value to provide compressed data and transmits the compressed data via the transmitter to a receiver. Sparse data other than sensor data may also be compressed based at least in part on an estimated sparsity value.

20 Claims, 7 Drawing Sheets

(56) References Cited

U.S. PATENT DOCUMENTS

| | | | | |
|---|---|---|---|---|
| 8,489,403 | B1* | 7/2013 | Griffin | G10L 19/008 375/260 |
| 8,516,340 | B2* | 8/2013 | Beadle | H04L 69/04 348/392.1 |
| 8,538,329 | B2* | 9/2013 | Beadle | H04B 1/0025 341/122 |
| 8,538,749 | B2* | 9/2013 | Visser | G10L 21/02 704/200 |
| 8,811,758 | B2* | 8/2014 | Paffenroth | H04N 19/90 345/555 |
| 8,855,190 | B2 | 10/2014 | Tian et al. | |
| 8,861,655 | B1 | 10/2014 | Al-Naffouri et al. | |
| 8,872,688 | B2* | 10/2014 | Gangopadhyay | H03M 1/1245 341/122 |
| 9,250,081 | B2* | 2/2016 | Gutmann | G05D 1/0231 |
| 9,534,899 | B2* | 1/2017 | Gutmann | G05D 1/0231 |
| 9,549,253 | B2* | 1/2017 | Alexandridis | H04R 3/005 |
| 9,691,395 | B1* | 6/2017 | Sieracki | G10L 17/26 |
| 2010/0182950 | A1* | 7/2010 | Sexton | H03M 7/30 370/328 |
| 2010/0290395 | A1* | 11/2010 | Sexton | H03M 7/30 370/328 |
| 2010/0310011 | A1* | 12/2010 | Sexton | H03M 1/129 375/316 |
| 2011/0191496 | A1* | 8/2011 | Luo | G06F 15/16 709/247 |
| 2012/0002564 | A1* | 1/2012 | Sexton | H03M 7/30 370/252 |
| 2013/0070624 | A1 | 3/2013 | Nguyen et al. | |
| 2013/0138246 | A1* | 5/2013 | Gutmann | G05D 1/0231 700/253 |
| 2013/0138247 | A1* | 5/2013 | Gutmann | G05D 1/0231 700/253 |
| 2014/0031980 | A1* | 1/2014 | Gutmann | G05D 1/0231 700/253 |
| 2014/0126617 | A1 | 5/2014 | Jung et al. | |

FOREIGN PATENT DOCUMENTS

| | | |
|---|---|---|
| WO | WO2012034006 A1 | 3/2012 |
| WO | WO2013183896 A1 | 12/2013 |
| WO | WO2014001182 A1 | 1/2014 |

OTHER PUBLICATIONS

Haupt et al., "Adaptive Sensing for Sparse Recovery", in the Proceedings of the 5th IEEE Signal Processing Education Workshop and Digital Signal Processing Workshop, Jan. 2009, 39 pages.

Ji et al., "An Improved Reconstruction methods of Compressive Sensing Data Recovery in Wireless Sensor Networks", in the International Journal of Security and Its Applications, vol. 8, No. 1, Jan. 2014, 8 pages.

Lopes, "Estimating Unknown Sparsity in Compressed Sensing", in the Proceedings of the 30th International Conference on Machine Learning, Jun. 16, 2013, 9 pages.

Marvasti et al., "A Unified Approach to Sparse Signal Processing", in the Proceedings of the Computing Research Repository, Feb. 2009, 43 pages.

Masoum et al., "A distributed compressive sensing technique for data gathering in Wireless Sensor Networks", in the Proceedings of the 4th International Conference on Emerging Ubiquitous Systems and Pervasive Networks Oct. 21, 2013, 10 pages.

Sarvotham et al., "Sudocodes—Fast Measurement and Reconstruction of Sparse Signals", in Proceedings of IEEE International Symposium on Information Theory, Jul. 9, 2006, 5 pages.

* cited by examiner

SPARSITY ESTIMATION FOR DATA TRANSMISSION

BACKGROUND

Many electronic devices, such as sensors, operate on battery power or are turned on substantially 24 hours per day. Examples of sensors include image sensors such as cameras, environmental sensors such as temperature or humidity sensors, and accelerometers or strain gauges used, e.g., to measure loads and response of bridges. Sensors and other devices may be interconnected, e.g., using wired or wireless network connections carrying network traffic. Sensor data or other data to be transmitted may be encapsulated, e.g., in the Internet Protocol (IP). A set of deployed sensors or other devices so interconnected is sometimes referred to as part of the "Internet of Things" ("IoT"). Sensors or other electronic devices may also or alternatively store data, e.g., sensor data, in onboard computer-readable memory such as a Flash memory. The stored data may then be retrieved via a network connection or a bus connection such as a Universal Serial Bus (USB) connection by a desktop computer.

Many sensors provide "sparse" sensor data. Sparse sensor data is sensor data in which the number of information-carrying bits is low compared to the total number of bits the sensor could provide. In an example, a low-resolution seismograph may produce sparse data since the needle only moves when earthquakes happen, and is substantially still the rest of the time. In another example, an indoor temperature sensor that transmits data only when the temperature changes may produce sparse data since indoor ventilation systems work to keep the temperature substantially constant.

Compressive Sensing (CS) is sometimes used to compress sparse data, such as sparse sensor data. Compressive Sensing involves transforming P samples of sparse data into M coefficients, $M \ll P$, using a projection matrix $\Phi$. The samples of sparse data and the coefficients may be represented as vectors. The M coefficients may then be stored or transmitted to a receiver. To recover the P samples, an inverse computation is carried out using the projection matrix $\Phi$ and the M coefficients. Since $M \ll P$, there are a potentially-infinite number of possible solutions to the inverse computation. However, for sparse data, the sparsest of the possible solutions has a high probability of being the P-sample sparse data vector. The usable number of coefficients M is limited by how sparse the data are. Sparsity is often measured using a sparsity value K, which is the number of nonzero coefficients in a P-sample data vector. In an example, $M \geq K \log(P/K)$.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Embodiments of the present description include transmission data set processing, including estimation of the sparsity of a data set, which enables more efficient compression of the data set and thus reduces the energy required for computation of the compressed coefficients and for network transmission of the compressed coefficients. Random or pseudo-random bits are generated and used to provide values from selected statistical distributions. These values can then be combined with values of data to be compressed to estimate the sparsity of the data to be compressed. The data to be compressed may include measurements captured using a sensor. Compression can then be carried out to a level appropriate for the estimated sparsity. Sparsity estimation and corresponding compression reduces the energy, bandwidth and storage requirements for the sensor or other electronic device.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Embodiments of the present description include hardware and software implementations of sparsity estimation, which enables more efficient compression of sparse data sets than conventional compressive-sensing techniques. These implementations use random bits, which may be readily generated, to produce test vectors useful for estimating a sparsity value of a dataset. The sparsity value is correlated with the number of nonzero entries in a given set of samples. The higher the sparsity value, the more efficiently the data set may be compressed.

Embodiments include processes, systems, and apparatuses for estimating the sparsity of data sets, e.g., of sensor data. In various embodiments, sparsity values of a data set may be estimated on-line, i.e., as data samples are received. Random bits are generated and transformed into values from statistical distributions. Those values are then used to estimate sparsity values of the data set. The received data may be compressed according to the estimated sparsity values ("sparsity-adaptive compression").

In some embodiments, sparsity estimation and sparsity-adaptive compression permit more efficiently compressing data, since compression efficiency of compressive-sensing techniques is directly correlated with signal sparsity. Sparsity estimation may also reduce the memory requirements of processing sensor data since, unlike conventional schemes that allocate storage for the least-sparse expected input data, sparsity-adaptive compression need only allocate storage based on the sparsity value estimated in the data. Reducing compressed data size reduces the bandwidth and storage requirements for systems that, e.g., log or process sensor data.

Embodiments described herein are amenable to implementation in specialized hardware such as in an application-specific integrated circuit (ASIC), or in programmable logic device such as a field-programmable gate array (FPGA). Various aspects of embodiments are also amenable to implementation in a multi-core processing unit, a system-on-chip (SoC) (e.g., one or more decision tree scoring cores on an SoC), and/or as a general purpose processing unit with an extended instruction set, and thus able to partially or wholly execute decision trees responsive to one or more atomic processing unit instructions. The devices, processes, and systems described herein may be implemented in a number of ways. Example implementations are provided below with reference to the following figures.

Example Environment

Figure 1:
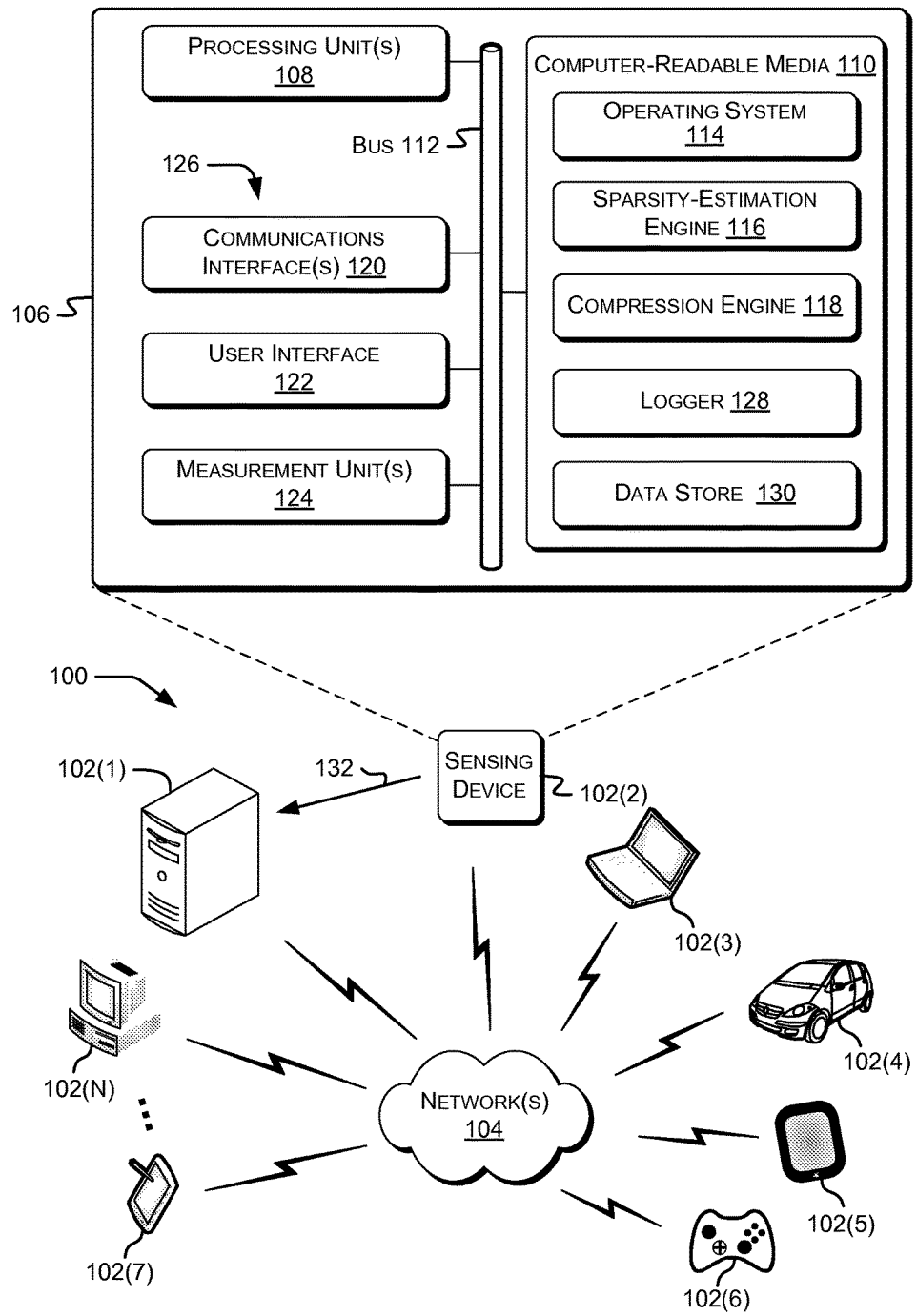
FIG. 1 depicts a block diagram depicting an example environment for implementing sparsity estimation or data compression as described herein, and shows an example computing system usable to perform various methods described herein.

FIG. 1 shows an example environment 100 in which electronic devices such as sensing devices may operate and in which sparsity-estimation and data-compression methods such as described herein may be performed. FIG. 1 also shows an example computing system usable to perform various methods described herein. In the illustrated example, the various devices and/or components of the environment 100 include electronic device(s) 102(1)-102(N) (e.g., computing devices, sensing devices, or IoT devices, individually or collectively referred to herein with reference 102), where N is any integer greater than or equal to 1. Although illustrated as, e.g., desktop computers, laptop computers, tablet computers, or cellular phones, the electronic device(s) 102 may include a diverse variety of device categories, classes, or types and are not limited to a particular type of device.

By way of example and not limitation, the electronic device(s) 102 may include, but are not limited to, server computers such as Web servers (e.g., 102(1)), sensing devices such as biometric or medical sensors worn on or implanted in the body, environmental sensors, or accelerometers (e.g., 102(2)), laptop computers, thin clients, terminals, or other mobile computers (e.g., 102(3)), automotive computers such as vehicle control systems, vehicle security systems, or electronic keys for vehicles (e.g., 102(4), represented graphically as an automobile), smartphones, mobile phones, tablet computers, mobile phone-tablet hybrid devices, wearable computers such as smart watches, or other telecommunication devices (e.g., 102(5)), portable or console-based gaming devices or other entertainment devices such as network-enabled televisions, set-top boxes, media players, cameras, or personal video recorders (PVRs) (e.g., 102(6), represented graphically as a gamepad), personal data assistants (PDAs), computer navigation client electronic devices, satellite-based navigation system devices including global positioning system (GPS) devices and other satellite-based navigation system devices (e.g., 102(7), represented graphically as a PDA), desktop computers (e.g., 102(N)), or integrated components, such as analog-to-information (A2I) converters or other components for inclusion in electronic device(s). Any of these types of electronic device(s) 102 may be configured to participate in or carry out sparsity estimation or data compression as described herein, e.g., to reduce energy, storage space, or network bandwidth.

Different devices or types of devices may have different compression schemes or needs. For example, battery-powered sensor devices have a more significant need for energy-efficient compression than do devices supplied by line power. Different devices or different types of devices may also include different sensors for detecting signals. In some examples, wall-mounted devices may include environmental sensors, permitting monitoring of indoor conditions, while portable devices may include motion sensors or audio sensors, permitting monitoring of motion or sound.

In some examples, the electronic devices 102 may communicate with each other or with other electronic devices via network(s) 104. For example, network(s) 104 may include public networks such as the Internet, private networks such as an institutional or personal intranet, or combination(s) of private and public networks. Network(s) 104 may also include any type of wired or wireless network, including but not limited to local area networks (LANs), wide area networks (WANs), satellite networks, cable networks, WI-FI networks, Worldwide Interoperability for Microwave Access (WiMAX) networks, mobile communications networks (e.g., 3G, 4G, and so forth) or any combination thereof. Network(s) 104 may utilize communications protocols, such as, for example, packet-based or datagram-based protocols such as internet protocol (IP), Transmission Control Protocol (TCP), User Datagram Protocol (UDP), other types of protocols, or combinations thereof. Moreover, network(s) 104 may also include a number of devices that facilitate network communications or form a hardware infrastructure for the networks, such as switches, routers, gateways, access points, firewalls, base stations, repeaters, backbone devices, and the like. Network(s) 104 may also include devices that facilitate communications between electronic devices 102 using bus protocols of various topologies, e.g., crossbar switches, INFINIBAND switches, or FIBRE CHANNEL switches or hubs. Different networks may have different characteristics, e.g., bandwidth, latency, accessibility (open, announced but secured, or not announced), availability (full or part-time) or coverage area. Energy and bandwidth needs of particular electronic devices 102 are influenced by the characteristics of the networks those electronic devices 102 are designed to connect to.

In some examples, network(s) 104 may further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.1 in, and so forth), other standards, e.g., BLUETOOTH, cellular-telephony standards such as Global System for Mobile Communications (GSM), Long Term Evolution (LTE), or WiMAX, or multiples or combinations thereof.

Details of an example electronic device 102(2) are illustrated at inset 106. The details of the example electronic device 102(2) may be representative of others of the electronic device(s) 102. However, each of the electronic devices 102 may include additional or alternative hardware and/or software components. Still referring to the example of FIG. 1, electronic device 102(2) may include one or more processing unit(s) 108 operably connected to one or more computer-readable media 110 such as via a bus 112, which in some instances may include one or more of a system bus, a data bus, an address bus, a PCI bus, a Mini-PCI bus, a Peripheral Component Interconnect Express (PCIe) bus, and any variety of local, peripheral, or independent buses, or any combination thereof. In some examples, plural processing units 108 may exchange data through bus 112 rather than or in addition to network 104. While the processing units 108 are described as residing on the electronic device 102, the processing units 108 may also reside on different electronic devices 102 in some examples. In at least two of the processing units 108 may reside on different electronic devices 102. In such examples, multiple processing units 108 on the same electronic device 102 may use an interface bus 112 of the electronic device 102 to exchange data, while processing units 108 on different electronic devices 102 may exchange data via network(s) 104.

The computer-readable media 110 may store, for example, executable instructions of an operating system 114, a sparsity-estimation engine 116, a compression engine 118, and other modules, programs, or applications that are loadable and executable by processing unit(s) 108. In some examples not shown, one or more of the processing unit(s) 108 in one of the electronic device(s) 102 may be operably connected to computer-readable media 110 in a different one of the electronic device(s) 102, e.g., via communications interface 120 and network 104. For example, program code to perform steps of flow diagrams herein may be downloaded from a server, e.g., the electronic device 102(1), to a client, e.g., the electronic device 102(2), e.g., via the network 104, and executed by one or more processing unit(s) 108 in the electronic device 102(2). In various examples, the electronic device 102(2) may include sparsity-estimation engine 116, compression engine 118, or both.

Processing unit(s) 108 may be or include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. For example, and without limitation, illustrative types of hardware logic components that may be used in or as processing units 108 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customizable processing unit(s). For example, a processing unit 108 may represent a hybrid device, such as a device from ALTERA or XILINX that includes a CPU core embedded in an FPGA fabric. These or other hardware logic components may operate independently or, in some instances, may be driven by a CPU. In some examples, at least some of the electronic device(s) 102(1)-102(N) may include a plurality of processing units 108 of multiple types. For example, the processing units 108 in the electronic device 102(1) may be a combination of one or more GPGPUs and one or more FPGAs. Different processing units 108 may have different execution models, e.g., as is the case for graphics processing units (GPUs) and central processing unit (CPUs). In some examples, separate first and second processing units may be used to efficiently process signal data while reducing power consumption. In some examples, sparsity estimation may be performed using the first processing unit having an FPGA, ASIC, or DSP, and sparsity-adaptive data compression may be performed using the second processing unit having a CPU.

The electronic device 102 may also include one or more communications interfaces 120 to enable wired or wireless communications between the electronic device 102 and other networked electronic devices 102 involved in sensing, security locking, or security-timeout adjustment, or other electronic device(s), over network(s) 104. Such communications interface(s) 120 may include one or more transceiver devices, e.g., network interface controllers (NICs) such as Ethernet NICs or other types of transceiver devices to send and receive communications over a network. The processing units 108 may exchange data through respective communications interface(s) 120. In some examples, the communications interface 120 may be a PCIe or other bus transceiver, and the network 104 may be a PCIe or other bus, e.g., a controller area network (CAN) bus. In some examples, the communications interface 120 may include, but is not limited to, a transceiver for cellular (3G, 4G, or other), WI-FI, Ultra-wideband (UWB), BLUETOOTH, or satellite transmissions. The communications interface 120 may include a wired I/O interface, such as an Ethernet interface, a serial interface, a Universal Serial Bus (USB) interface, an INFINIBAND interface, or other wired interfaces. For simplicity, these and other components are omitted from the illustrated electronic device 102. Signals relating to characteristics of any networks or other links reachable by communications interface 120 may be used, for example, to determine when to transmit data and when to store data.

Computer-readable media described herein, e.g., computer-readable media 110, includes computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage devices, and/or storage media that may be used to store and maintain information for access by an electronic device.

In contrast to computer storage media, communication media may embody computer-readable instructions, data structures, program modules, or other data in a modulated data signal, such as a carrier wave, or other transmission mechanism. As defined herein, computer storage media does not include communication media.

In some examples, computer-readable media 110 may store instructions executable by the processing unit(s) 108 that, as discussed above, may represent a processing unit incorporated in the electronic device 102. The computer-readable media 110 may additionally or alternatively store instructions executable by external processing units such as by an external CPU or external processing unit of any type discussed above. In various examples at least one processing unit 108, e.g., a CPU, GPU, or hardware logic device, may be incorporated in the electronic device 102, while in some examples at least one processing unit 108, e.g., one or more of a CPU, GPU, or hardware logic device, may be external to the electronic device 102.

The computer-readable media 110 of the electronic device 102 may store an operating system 114. In some examples, operating system 114 may be omitted or otherwise not used (commonly referred to as a "bare metal" configuration). In various examples, operating system 114 may include components that enable or direct the electronic device 102 to receive data via various inputs (e.g., user controls, network or communications interfaces, memory devices, or sensors), and process the data using the processing unit(s) 108 to generate output. The operating system 114 may further include one or more components that present the output (e.g., display an image on an electronic display, store data in memory, or transmit data to another electronic device). The operating system 114 may enable a user to interact with modules of the sparsity-estimation engine 116 or the compression engine 118 using a user interface 122. Additionally, the operating system 114 may include components that perform various functions generally associated with an operating system, e.g., storage management and internal-device management.

In some examples, the electronic device 102 may include user interface 122. User interface 122 may include one or more peripheral output devices, configured for communication to a user or to another electronic device. Output devices may be integral or peripheral to the electronic device 102. Examples of output devices may include a display, a printer, audio speakers, beepers, or other audio output devices, a vibration motor, linear vibrator, or other haptic output device, and the like.

User interface 122 may include one or more peripheral input devices, integral or peripheral to the electronic device 102. The peripheral input devices may be user-operable, or may be configured for input from other electronic devices. Examples of input devices may include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device, a gestural input device such as a touchscreen, and the like. User interface 122 may include a touchscreen, as noted above, a microphone or other auditory input, or an accelerometer, grip sensor, or other haptic input.

In some examples, the electronic device 102 may include one or more measurement unit(s) 124. Measurement units 124 may detect physical properties or status of the electronic device 102 or its environment. Examples of measurement units 124 may include units to detect motion, temperature, pressure, light, sound, electromagnetic radiation (e.g., for wireless networking), or any other detectable form of energy or matter in or within sensing range of the electronic device 102. In some examples of a smartphone electronic device 102, measurement units 124 may include an accelerometer, a microphone, or front- and rear-facing cameras. Examples of measurement units 124 may include devices for measuring physical properties, devices for communicating, or devices for receiving information. In some examples, measurement units 124 may include a network transceiver (e.g., communications interface 120), a motion sensor, a proximity detector (e.g., for nearby life forms, people, or devices), a light sensor (e.g., a CdS photoresistor or a phototransistor), a still imager (e.g., a charge-coupled device, CCD, or complementary metal-oxide-semiconductor, CMOS, imager), a video imager (e.g., CCD or CMOS), a microphone, a fingerprint reader, a retinal scanner, or a touchscreen (e.g., in or associated with a display in user interface 122.

In some examples, the electronic device 102 may include one or more sensors 126. Components of communications interface 120, e.g., transceivers for BLUETOOTH, WI-FI, or LTE, may be examples of sensors. Such components may be used to, e.g., detect signals corresponding to characteristics of accessible networks. Such signals may also be detected by automatically locating information in a table of network information (e.g., cell-phone tower locations), or by a combination of detection by component of communications interface 120 and table lookup. Components of user interface 122, e.g., touchscreens or phone mouthpieces, may also be examples of sensors 126. Measurement units 124 may also be examples of sensors 126. In some examples, a particular device may simultaneously or selectively operate as part of two or more of communications interface 120, user interface 122, and one or more measurement unit(s) 124. For example, a touchscreen may be an element of user interface 122 and used to present information and receive user commands. Signals from the same touchscreen may also be used, e.g., in determining a user's grip on the electronic device 102. Accordingly, that touchscreen may also be a sensor 126.

In some examples, sensors 126 may transmit or provide nonzero data only on changes in a condition. For example, an indoor temperature sensor with a resolution of 1° F. may only change value every 20 minutes. If the temperature sensor transmits "deltas," i.e., indications of changes, there will only be one record every 20 minutes.

In some examples, sensors 126 may transmit or provide nonzero data only on differences between a measurement and a reference. For example, electrocardiogram (ECG) data includes multiple correlated data sets, each of which closely matches an average waveform in normally-functioning hearts. Some example ECG sensors may transmit only the differences between the average and a measured signal, or may transmit only the differences between measured signals. This may increase the sparsity of the ECG data.

In some examples, logger 128 includes logic or computer program instructions executable by processing unit(s) 108 to record readings from sensors 126, e.g., in data store 130 on computer-readable media 110. In the example shown, computer-readable media 110 stores executable instructions of logger 128. Logger 128 may also or alternatively record computations performed or results provided by sparsity-estimation engine 116 or compression engine 118. In some examples, data of signals from sensors 126, data of computations performed by sparsity-estimation engine 116 or compression engine 118, and resulting compressed data may be logged in an operating-system or other event logger (e.g., MICROSOFT eventvwr).

In some examples, the electronic device 102(2), e.g., a sensing device, senses data using one or more sensor(s) 126, estimates a sparsity value of the sensed data using sparsity-estimation engine 116, and compresses the sensed data using Compressive Sensing (CS) techniques based at least in part on the determined sparsity value to provide compressed data. As indicated by arrow 132, the electronic device 102(2) may then transmit the compressed data to, e.g., a server computer 102(1) or desktop computer 102(N). The electronic device 102 receiving the compressed data may decompress the compressed data to recover the sensed data. In some of these examples, the sensing electronic device 102(2) may be powered by batteries or energy harvesting subsystems, and server computer 102(1) or desktop computer 102(N) may be powered by electrical line power such as a 120 VAC feed from a substation. Many implementations of CS use more energy to decompress than to compress. Using CS permits reducing the energy consumption of sensing device 102(2) and operating the more energy-consuming decompression off the line power.

In some examples, processing units 108 in at least some of electronic device(s) 102(1)-102(N) may include ASICs or other logic devices that include hardware corresponding to operation(s) to be performed, and do not require a stored program. In some of these examples, such electronic device(s) 102(1)-102(N) may omit computer-readable media 110. In these examples, sparsity-estimation engine 116, compression engine 118, and other modules described herein as including executable instructions stored on computer-readable media 110 may instead or additionally be implemented as intellectual property (IP) cores, logic blocks, portions of a gate array, or other implementations configured to perform corresponding functions described herein. As such, estimation engine 116, compression engine 118, logger 128, and data store 130 may be implemented within processing unit(s) 108. For example, data store 130 may be implemented as an on-chip Flash memory or battery-backed SRAM in processing unit(s) 108.

General Purpose Processing Unit with Extended Instruction Set

In some embodiments, the instruction set architecture of a general purpose processing unit (e.g., processing unit 108) may be extended to include sparsity estimation, data compression, and state. In some embodiments, the extended instruction set includes an instruction to update an estimated sparsity value upon receipt of a new sample of data. In some embodiments, the extended instruction set includes an instruction to compress a P-element vector of data into an M-element vector of coefficients, M<<P, given an estimated sparsity value.

The state usable by a general purpose processing unit with an extended instruction set to perform sparsity estimation or compression may include accumulators and counters such as those discussed below with reference to FIG. 4. As a data structure, the accumulators may be represented as an array of numeric values, e.g., floating-point, fixed-point, or integer values. The counters may be represented as an array of integer values.

In some embodiments, computer-readable memory storing the accumulators, counters, or other state may be integrated into the general purpose processing unit, stored externally to it, or may be coupled to external memory through a memory cache hierarchy.

Example Data Compression Device

Figure 2:
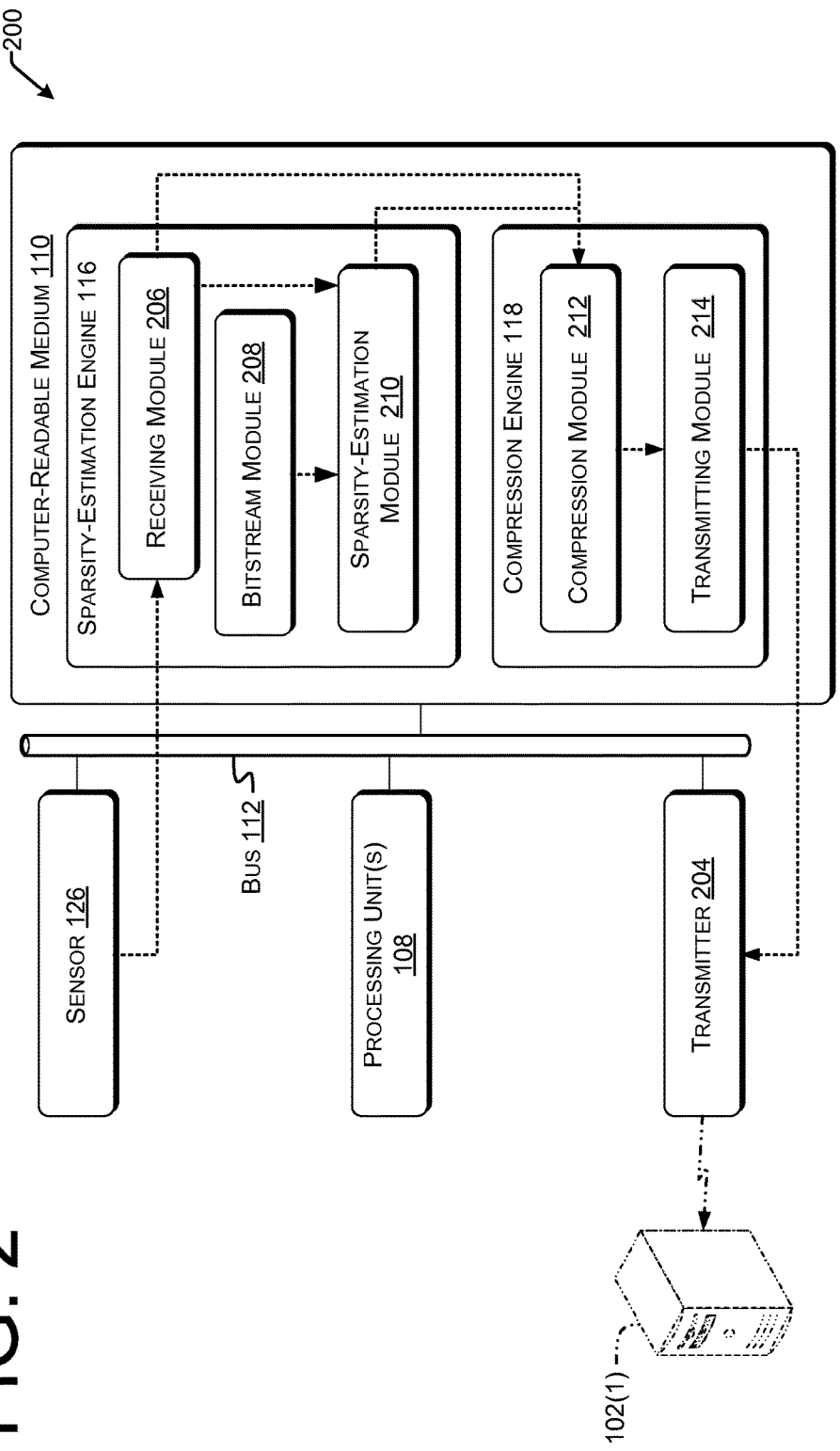
FIG. 2 depicts a block diagram of an example data compression device that includes a sparsity estimator in accordance with various embodiments.

FIG. 2 depicts a block diagram of an example data compression device 200 that includes a sparsity estimator in accordance with various embodiments. Device 200 may represent sensing electronic device 102(2), FIG. 1. For clarity, example data flows are shown using dashed arrows.

The illustrated device 200 includes the sensor 126 configured to output sensor data 202 corresponding to at least one physical property. For example, the at least one physical property may include a physical property of the device 200 or an environment of the device 200. Sensor 126 may include, e.g., an accelerometer such as may be mounted on a bridge (detects a property of the device 200, namely motion thereof) or a temperature sensor (detects a property of the room or other environment in which the device 200 is located).

The illustrated device 200 also includes a transmitter 204. The transmitter 204 may include a wired or wireless transmitter, e.g., a radio transmitter. In some examples, the transmitter 204 may include a network transmitter such as those discussed above with respect to communications interface 120, FIG. 1.

The device 200 also includes one or more processing unit(s) 108 coupled to the sensor 126 and the transmitter 204, e.g., via the bus 112. In the illustrated example, the device 200 includes the computer-readable media 110 coupled to the processing unit(s) 108 via the bus 112. The computer-readable media 110 may be or include computer storage media, as discussed above with reference to FIG. 1. In the illustrated example, the computer-readable media 110 (e.g., the computer storage media) has one or more program modules stored thereon and executable by the one or more processing unit(s) to perform functions described below. In other examples, the computer-readable media 110 is not included in the device 200, and processing unit(s) 108 include gate arrays, IP cores, or other computational or electronic structures configured to perform functions described below. The program modules (or electronic structures) may include sparsity-estimation engine 116 having receiving module 206, bitstream module 208, and sparsity-estimation module 210 (which may be an example of a sparsity estimator), and compression engine 118 having compression module 212 and transmitting module 214.

In the sparsity-estimation engine 116 or the compression engine 118, the number of modules may vary higher or lower, and modules of various types may be used in various combinations. For example, functionality described associated with the illustrated modules may be combined to be performed by a fewer number of modules or APIs or may be split and performed by a larger number of modules or APIs. For example, the bitstream module 208 and the sparsity-estimation module 210 may be combined in a single module that performs at least some of the example functions described below of each of the modules 208, 210. The sparsity-estimation engine 116 and the compression engine 118 may also or alternatively be combined into a single engine performing the functions of both.

The receiving module 206 may receive a plurality of samples of the sensor data from the sensor 126. The plurality may include, e.g., at least three samples. Using at least three samples permits selecting a vector of some (but not all) of the sensor data. The number of received samples is denoted P. Throughout this disclosure, the electronic device 200 may detect additional signals or sets of signals that are not processed by herein-described modules or do not undergo herein-described processing steps.

The bitstream module 208 may determine a plurality of bits, in which each bit has a substantially equal probability of being determined as a 0 bit or of being determined as a 1 bit. In some examples, each bit in the plurality of bits may be determined by a random or pseudorandom process that gives each possible bit value substantially a 50% probability of occurrence. The plurality of bits may include a sequence of an appropriate length, in which each successive bit has substantially a 50% chance of being a 0 bit. Additional bits may be generated but not used. In some examples, the plurality of bits includes successive outputs of a linear feedback shift register (LFSR), as discussed below with reference to LFSR 304, FIG. 3. In some examples, the bitstream module 208 includes computer program instructions executable by processing unit(s) 108 to produce a pseudorandom bit using modular arithmetic or other techniques for generating pseudorandom bits.

The sparsity-estimation module 210 may estimate a sparsity value of the sensor data from receiving module 206 based at least in part on the sequence of bits from bitstream module 208 and the sensor data. This is discussed below with reference to FIGS. 3 and 4. In some examples, the sparsity value may be estimated using a sample subset of at least two, and fewer than all, of the plurality of the samples of the sensor data. In some examples, using estimated sparsity values ŝ instead of raw sparsity values K (also denoted $\|x\|_0$) improves performance. Many systems use "pseudo-sparsity" to reduce the value of K. These systems ignore any sample f that is within a dead band, e.g., 0±h for some threshold h. However, these systems are limited in that the threshold must be adjusted by hand. Using estimated sparsity values ŝ removes the need to use pseudo-sparsity, since smaller sample values f do not increase the estimated sparsity value ŝ as much as they increase K.

The compression module 212 compresses the received samples of the sensor data based at least in part on the determined sparsity value to provide compressed data. The compression module 212 may receive the samples, e.g., from receiving module 206, as shown, directly from the sensor 126, or via the sparsity-estimation module 210. In some examples, the compression module 212 may determine an encoder matrix Φ that is incoherent with a projection basis Ψ in which the data to be compressed are sparse, as discussed below with reference to FIG. 3. For example, Φ may be an M×N dimensional matrix whose entries are chosen from a Bernoulli distribution, i.e., chosen to be +1 or −1 with uniform probability, or are chosen from the Normal distribution N(0, 1). In some examples, Φ may be selected from the Bernoulli distribution, which may reduce energy used during compression since multiplying by ±1 and adding are very computationally efficient.

The transmitting module 214 may transmit the compressed data via the transmitter 204 to a receiving electronic device 102(1) (shown in phantom). The compressed data may be transmitted by any communications protocol, wired or wireless, e.g., a network or point-to-point protocol.

In some examples, the sparsity-estimation module 210, the compression module 212, or another module (not shown) may determine a number of bits to represent the compressed data based at least in part on the estimated sparsity value of the sensor data. The determined number of bits may be a multiple of the number M of coefficients of compressed data. In some examples, the number of bits may be positively correlated with the estimated sparsity value. As discussed above, the sparsity value K of a data vector f̂ is the number of nonzero components in f̂. The estimated sparsity value ŝ may be used in determining the number of bits. For example, using 32-bit floating-point values for the M coefficients, M may be selected as M≥ŝ log(P/ŝ).

Example Sparsity Estimation and Data Compression

Figure 3:
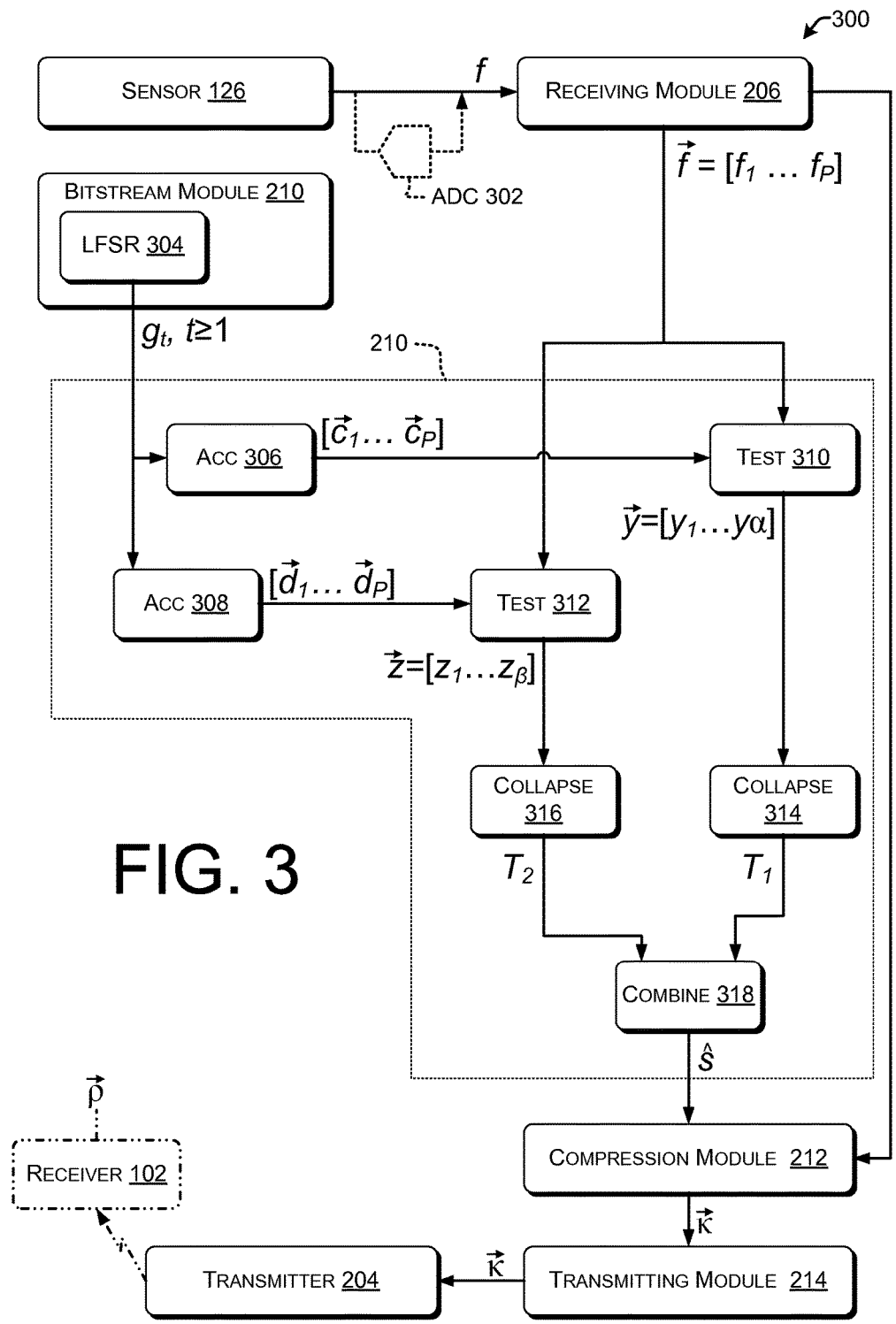
FIG. 3 depicts a dataflow diagram illustrating an example architecture of sparsity estimation in accordance with various embodiments.

FIG. 3 depicts a dataflow diagram illustrating an example architecture 300 of an electronic device 200 implementing sparsity estimation in accordance with various embodiments. FIG. 3 also shows example notation used throughout this disclosure. The illustrated dataflow may represent an implementation of the electronic device 200 on a specialized integrated circuit or a programmable integrated circuit, such as an A2I converter, or may represent a sequence of processing steps carried out by a processing unit 108 under control of executable instructions stored in the computer-readable media 110.

The sensor 126 outputs samples of data. The receiving module 206 may receive the samples, e.g., directly from the sensor 126 or via an analog-to-digital converter (ADC) 302 (shown dashed for clarity). The sensor 126, the ADC 302, or the receiving module 206 may group the samples into P-sample vectors $\vec{f}$ having elements $f_j$, where j∈[1, P]. Throughout this disclosure, for clarity of explanation, vectors are row vectors unless otherwise indicated. Consequently, vector transposes $\vec{\bullet}^T$ are indicated in equations as necessary. Vectors are not limited to row vectors, and may be column vectors.

In some examples, sensor data $\vec{f}$ may be projected to form projected data vectors $\vec{x}$, where $\vec{x}=[x_1 \ldots x_P]$. Projection may include multiplication by a selected projection basis, e.g., a P×P matrix Ψ, in which case, as shown in Eq. (1):

$$\vec{x} = \Psi(\vec{f}^T). \quad (1)$$

Instead of or in addition to multiplication by P, other operations such as Fourier or wavelet transforms may be used to form projected data vectors $\vec{x}$. In some examples, matrix Ψ may be the identity matrix or may be omitted, so $x_k = f_k$, k∈[1, P]. In some examples, matrix Ψ or other projection transforms the sensor data f into a different domain so that the transformed sensor data $\vec{x}$ are sparser than the sensor data f. For example, a 440 Hz sinusoidal signal is not sparse in the time domain, since the amplitude of the signal is continuously changing. However, the signal is sparse in the frequency domain (e.g., after a Fourier transform), in which the entire content of the signal is a single peak at 440 Hz and zero everywhere else. The same is true of the sum of any finite number of sinusoids. Throughout the following discussion, except where expressly indicated, transformed sensor data $\vec{x}$ may be used in place of sensor data $\vec{f}$.

The bitstream module 208 outputs the plurality of bits, e.g., using an LFSR 304. LFSR 304 may include a shift register in which the input may be an exclusive-or (XOR) of some of the output bits (the "taps") or in which XOR ("⊕" herein) gates are inserted between some of the bits of the shift register. For example, the input of a 15-bit shift register with bits $b_{14} \ldots b_0$ and output $b_0$ may be computed as $b_0 \oplus b_1$ or $b_0 \oplus b_6$. The bits are denoted $g_t$ for a time t≥1 (e.g., in clock cycles). Specifically, in some examples, one or more program modules stored in computer-readable medium 110 are executable by the one or more processing unit(s) 108 to determine the plurality of bits using LFSR 304.

In the sparsity-estimation module 210, in the illustrated example, the bits $g_t$ are used to determine a plurality of distribution vectors $\vec{c}_k$ from a first selected distribution, and a plurality of distribution vectors $\vec{d}_k$ from a second selected distribution based at least in part on the plurality of bits $g_t$. In some examples, k∈[1, P], and each vector $\vec{c}_k$, $\vec{d}_k$ has P elements. In an example, the first distribution may be a Cauchy distribution or approximation thereof and the second distribution may be a Gaussian distribution or approximation thereof. The distribution vectors $c_k$, $d_k$ may be determined using accumulators 306, 308 ("Acc"), e.g., as discussed below with reference to FIG. 4. The distribution vectors $c_k$, $d_k$ may be determined based at least in part on projection basis Ψ or other projection techniques, e.g., as discussed below with reference to FIG. 4.

The sparsity-estimating module 210, in the illustrated example, may select one or more of the data vector(s) $\vec{f}$ from the received samples of the sensor data. The sparsity-estimating module 210 may then determine a vector $\vec{y}$ including a respective test value $y_k$ for each of the plurality of distribution vectors $\vec{c}_k$ based at least in part on the selected one of the one or more data vector(s) $\vec{f}$, e.g., using test-value generation unit 310 ("Test"). The sparsity-estimating module 210 may also determine a vector $\vec{z}$ including a respective test value $z_k$ for each of the plurality of distribution vectors $\vec{d}_k$ based at least in part on the selected one of the one or more data vector(s) $\vec{f}$, e.g., using test-value generation unit 312. In an example, test-value generation units 310, 312 compute the k inner (element-wise) products of each $\vec{c}_k$ with $\vec{f}$.

The sparsity-estimating module 210, in the illustrated example, may estimate a respective scale factor of each of the distributions, e.g., using scale-factor-determining units 314, 316 (labeled "Collapse" since they produce a single value from an input vector in some examples). For example, scale-factor-determining unit 314 may compute a scaled median $T_1$ of the absolute values of the $y_k$ test values corresponding to a Cauchy distribution. Scale-factor-determining unit 316 may compute a scaled sum of squares $T_2^2$ of the $z_k$ test values corresponding to a Gaussian distribution.

The sparsity-estimating module 210, in the illustrated example, may estimate the sparsity value of the sensor data vector(s) $\vec{f}$ by combining the determined respective scale factors, e.g., using combiner 318 ("Combine"). In some examples, the combiner 318 combines the determined respective scale factors $T_1$, $T_2^2$ by dividing the determined scale factor $T_1$, e.g., of the Cauchy distribution, by the determined scale factor $T_2^2$, e.g., of the Gaussian distribution. The result may be a sparsity value $\hat{s}(\vec{f})$, also referred to as a "numerical sparsity." In some examples, $\hat{s} \leq K$. That is, $\hat{s}$ does not overestimate how sparse $\vec{f}$ is. The sparsity-estimating module 210, in the illustrated example, may provide $\hat{s}$ to the compression module 212 as the estimated sparsity value.

The compression module 212, in the illustrated example, may select a value of M using the determined estimated sparsity value $\hat{s}$ such that $M \leq \hat{s} \log(P/\hat{s})$. The compression module 212 may then multiply the P-element sensor data vector $\vec{f}$ (e.g., from the receiving module 206) by an M×P compression matrix $\Phi$ to produce an M-element compressed-data vector $\vec{\kappa}$ of compressed data. The compression module 212 may provide the compressed-data vector $\vec{\kappa}$ to the transmitting module 214, which may transmit $\vec{\kappa}$ via transmitter 204. An electronic device 102 or other computing device ("receiver", shown in phantom) receiving the compressed-data vector $\vec{\kappa}$ may use $\Psi$ to determine reconstructed data $\vec{\rho}$ so that $\vec{\rho} \approx \vec{f}$. The same value of M and matrix $\Phi$ may be used for multiple P-element sensor data vectors $\vec{f}$. In at least some examples, the compression module 212 may provide matrix 1 to the transmitting module 214, which may then transmit $\Phi$ via transmitter 204 to a receiver.

In various examples, each vector $\vec{c}_k$, $\vec{d}_k$, $\vec{y}$, $\vec{z}$ may have a length other than P. Matrices and vector lengths may be determined to provide selected lengths for such vectors.

Still referring to FIG. 3, in some examples, the one or more program modules stored on the one or more computer storage media, e.g., the computer-readable medium 110, are further executable by the one or more processing unit(s) 108 to estimate the sparsity value of the sensor data by estimating a respective scale factor $T_1$, $T_2^2$ of each of a plurality of statistical distributions based at least in part on the plurality of bits $g_t$ and the sensor data $\vec{f}$. The modules are further executable to estimate the sparsity value $\hat{s}$ by combining the determined respective scale factors $T_1$, $T_2^2$.

In some examples, the plurality of distributions comprises a Cauchy distribution and a Gaussian distribution, as noted above. In some of these examples, the one or more program modules (e.g., the combiner 318) are further executable by the one or more processing unit(s) 108 to combine the determined respective scale factors by dividing the determined scale factor $T_1$ of the Cauchy distribution by the determined scale factor $T_2^2$ of the Gaussian distribution. The resulting quotient may be multiplied by $T_1$ to provide the estimated sparsity value $\hat{s}$, as discussed below with reference to Eq. (14).

In some examples, the one or more program modules are further executable by the one or more processing unit(s) 108 to estimate the respective scale factor of a selected distribution of the plurality of distributions as set forth below. The modules may apply the below processes to each of the plurality of distributions or to only some of the plurality of distributions. Specifically, the program modules are executable to determine a plurality of distribution vectors, e.g., $\vec{c}_k$ or $\vec{d}_k$, from the selected distribution based at least in part on the plurality of bits $g_t$.

In some examples, Gaussian and Cauchy distribution vectors may be determined by generating the bits $g_t$ as samples from a binomial distribution with substantially 50% probability, i.e., B(n,p) for some n and for $p \approx 0.5$. For large n, e.g., n>20, and for p not very near either 0.0 or 1.0, the binomial distribution approximates the Gaussian distribution as shown in Eq. (2):

$$B(n,p) \approx N(np, np(1-p)). \qquad (2)$$

Accordingly, the sum of n bits $g_t$ generated with $p \approx 0.5$ may be approximately a single sample from N(n/2, n/4). (Note that this distribution has a nonzero mean of n/2.) Therefore, a P-sample Gaussian distribution vector $\vec{d}_k$ may be generated from nP bits $g_t$, the sum of n bits forming each of the P samples.

Moreover, the Cauchy distribution may be defined as shown in Eq. (3)

$$C(0, \gamma) = \frac{N(0, \gamma)}{N(0, 1)}. \qquad (3)$$

Therefore, the binomial distribution may be used to approximate the Cauchy distribution as shown in Eq. (4):

$$C(0, \gamma) \approx \frac{B(4\gamma, 0.5) - 4\gamma/2}{B(4, 0.5) - 4/2}. \qquad (4)$$

(The subtractions of $4\gamma/2$ in the numerator and $4/2$ in the denominator offset the mean from n/2 to 0.)

Therefore, a P-sample Cauchy distribution vector $\vec{d}_k$ may be generated from 2nP bits $g_t$, where each of the P samples may be the quotient of two sums: the sum of n bits forming the numerator, and the sum of a further n bits forming the denominator. Estimating values from Gaussian and Cauchy distributions using random bits from a binomial distribution is much less computationally intensive than prior ways of drawing samples from such distributions, e.g., the Box-Muller method for drawing from a Gaussian distribution, which requires computing square roots (Press et al. *Numerical Recipes in C*. Cambridge: Cambridge Univ. Press, 1998. ISBN 0-521-35465-X. pp. 216-217). Therefore, using Eqs. (2) and (4) may reduce processing time and energy usage compared to prior ways of computing random values.

In some examples, projected data vectors $\vec{x}$ are sparse under a selected projection basis $\Psi$, as discussed above. In these examples, the number of bits $g_t$ used in estimating each sample from a distribution may be adjusted to take $\Psi$ into account. This permits estimating the sparsity of projected data vectors $\vec{x}$ without having to compute $\vec{x}=\Psi \vec{f}$. Avoiding this computation may save energy and reduce processing time.

For $\Psi$ a P×P matrix, each element $\vec{c}_{k_j}$ of distribution vector $\vec{c}_k$ may be distributed as in Eq. (5):

$$\vec{c}_{k_j} \sim C\left(0, \gamma \sum_{j=1}^{P} |\psi_{jk}|\right) \quad (5)$$

This distribution may be approximated using the bits $g_t$ as shown in Eq. (4), above. Therefore, the accumulator 306 generates one element $\vec{c}_{k_j}$ using $n_2$ samples for the numerator and $n_3$ samples for the denominator per Eqs. (6) and (7):

$$n_2 = 4\gamma \sum_{j=1}^{P} |\psi \Psi_{jk}|; \quad (6)$$

$$n_3 = 4. \quad (7)$$

In some examples, a value of $n_3 > 4$ may be chosen. In some examples, $n_i$, $i \in [1,3]$, may be chosen so that the distribution metrics of the approximate distribution, e.g., kurtosis and skewness, are within selected limits. For approximating a normal distribution, $n_i$ values can be chosen so that the kurtosis and skewness of the approximate distribution are within a selected distance of zero.

Similarly, each element $\vec{d}_{k_j}$ of distribution vector $\vec{d}_k$ may be distributed as in Eq. (8):

$$\vec{d}_{k_j} \sim N(0, \gamma \Psi_k^T \chi_k) \quad (8)$$

where $\Psi_j$ is the $j^{th}$ column vector of $\Psi$. This distribution may be approximated using the bits $g_t$ as shown in Eq. (2), above. Therefore, the accumulator 308 generates one element $\vec{d}_{k_j}$ using $n_1$ bits $g_t$ per Eq. (9):

$$n_1 = 4\gamma \chi_k^T \Psi_k \quad (9)$$

That is, in these examples, the one or more program modules are further executable by the one or more processing unit(s) 108 to determine a plurality of elements (e.g., $\vec{c}_{k_j}$ or $\vec{d}_{k_j}$) of each of the plurality of distribution vectors (e.g., $\vec{c}_k$ or $\vec{d}_k$) by summing one or more of the plurality of bits $g_t$. Note that computing dot products of bit vectors with sample vectors $\vec{f}$ may be isomorphic to computing sums of bits by the distributive law of multiplication over addition. In some examples, the one or more program modules are further executable by the one or more processing unit(s) to perform this summing by determining a respective number of the bits (e.g., $n_1$) for each of the plurality of distribution vectors (e.g., $\vec{d}_k$) based at least in part on a projection basis (e.g., $\Psi$) of the sensor data, and by summing the determined number of the bits.

Since the bits $g_t$ are random, the same bits may be used in the computations of elements $\vec{c}_{k_j}$ and $\vec{d}_{k_j}$. Alternatively, individual bits may be used for each computation. Therefore, using between $\max(n_1, n_2, n_3)$ and $n_1+n_2+n_3$ bits $g_t$, one element of a $\vec{c}_k$ vector may be determined and one element of a $\vec{d}_k$ vector may be determined. For clarity of explanation and without limitation, the discussion below is phrased in terms of $N=\max(n_1, n_2, n_3)$ bits $g_t$ being used to determine a pair of a respective elements $\vec{c}_{k_j}$ and $\vec{d}_{k_j}$.

Continuing these examples, the program modules may be further executable to select one or more data vector(s) $\vec{f}$ from the received samples of the sensor data. Each vector $\vec{f}$ may have P elements. Every sample of the sensor data may be used, in the order received or in any other order, or some samples may be selected out of those received, e.g., at random or on a selected pattern (e.g., every $n^{th}$ sample). P of the selected samples may be included in a vector $\vec{f}$. In some examples, exactly one vector $\vec{f}$ may be chosen and may be used for, e.g., a selected time period of measurements, such as one hour or one day, or a selected number l of samples, l>>P. In some examples, signal characteristics of the data to be compressed and power-consumption data of the sparsity-estimation logic are used to determine how often to estimate (or re-estimate) sparsity. Sparsity may be estimated per epoch or per vector, periodically at regular intervals (e.g., for ECG data), or at pre-characterized intervals depending on the signal characteristics. In some examples, sparsity is estimated whenever the amplitude or phase of the signal, or another selected characteristic of the signal, exceeds a selected a threshold or otherwise enters a trigger range, which may be open, semi-open, or closed.

The program modules may be further executable to determine a respective test value for each of the plurality of distribution vectors based at least in part on one of the one or more data vector(s). For clarity of explanation, and without limitation, this discussion uses a single vector $\vec{f}$. For example, the test value $y_k$ for each $\vec{c}_k$ may be determined per Eq. (10):

$$y_k = \sum_{j=1}^{P} \vec{c}_{k_j} f_j \quad (10)$$

where $f_j$ denotes the $j^{th}$ element of vector $\vec{f}$ and the elements $\vec{c}_{k_j}$ are computed per Eq. (5). NP bits $g_t$ may be used to perform this computation. The test values $y_k$ may be packaged into a test vector $\vec{y}$. Similarly, the test value $z_k$ for each $\vec{d}_k$ may be determined per Eq. (11), e.g., using the same NP bits $g_t$:

$$z_k = \sum_{j=1}^{P} \vec{d}_{k_j} f_j \quad (11)$$

where the elements $\vec{d}_{k_j}$ are computed per Eq. (8).

The test values $z_k$ may be packaged into a test vector $\vec{z}$. The test vectors $\vec{y}$ and $\vec{z}$ may have respective numbers of elements α and β, as in the illustrated example. The sizes α and β may be the same or different, and either or both may equal P or both may be different from P. When α=β, the test vectors $\vec{y}$ and $\vec{z}$ may be determined in full using NPα bits $g_t$. In some examples, the test vectors $\vec{y}$ and $\vec{z}$ may have the same number of elements, or respective, different numbers of elements.

Still referring to FIG. 3, in some examples, the program modules are executable to estimate the scale factor for each distribution, e.g., $T_1$ for the Cauchy distribution and $T_2^2$ for the Gaussian distribution, by combining the determined respective test values, e.g., test vectors $\vec{y}$ and $\vec{z}$, respectively. In some examples, $T_1$ may be computed from $\alpha \in \mathbb{Z}^+$ values of test vector $\vec{y}$ per Eq. (12):

$$T_1 = \frac{1}{\gamma} \mathrm{median}(|y_1|, \ldots, |y_\alpha|) \quad (12)$$

where γ is the same γ used in computing Eq. (5), values from which are used in computing the $y_k$ values per Eq. (10). Similarly, in some examples, $T_2^2$ may be computed from $\beta \in \mathbb{Z}^+$ values of test vector $\vec{z}$ per Eq. (13):

$$T_2^2 = \frac{1}{\gamma^2 \beta}(y_1^2 + \ldots + y_\beta^2) \quad (13)$$

where γ is the same γ used in computing Eq. (8), values from which are used in computing the $y_k$ values per Eq. (11). In some examples, α=β.

In some examples, as noted above, the one or more program modules (e.g., the combiner 318) are further executable by the one or more processing unit(s) 108 to combine the determined respective scale factors $T_1$, $T_2^2$ by dividing the determined scale factor $T_1$ of the Cauchy distribution by the determined scale factor $T_2^2$ of the Gaussian distribution to form the estimated sparsity value $\hat{s}$, per Eq. (14):

$$\hat{s} = \frac{T_1^2}{T_2^2} = T_1\left(\frac{T_1}{T_2^2}\right) \quad (14)$$

Computing $\hat{s}$ as described above permits architecture 300 to estimate the sparsity value of sample vectors $\hat{f}$ that are sparse in a basis (e.g., Ψ) rather than in the time domain without applying Ψ to samples $f_k$. This reduces power consumption of the sparsity estimation, and permits the sparsity estimation to be used with many signals (such as finite sums of sinusoids) that are not sparse in the time domain. Architecture 300, by providing the ability to estimate sparsity on such signals with low energy consumption, further permits adjusting the compression performed by compression module 212 over time, so that data bandwidth may be reduced when the sensor data f are more sparse than average while retaining the ability to compress sensor data f that are less sparse.

Example Device

Figure 4:
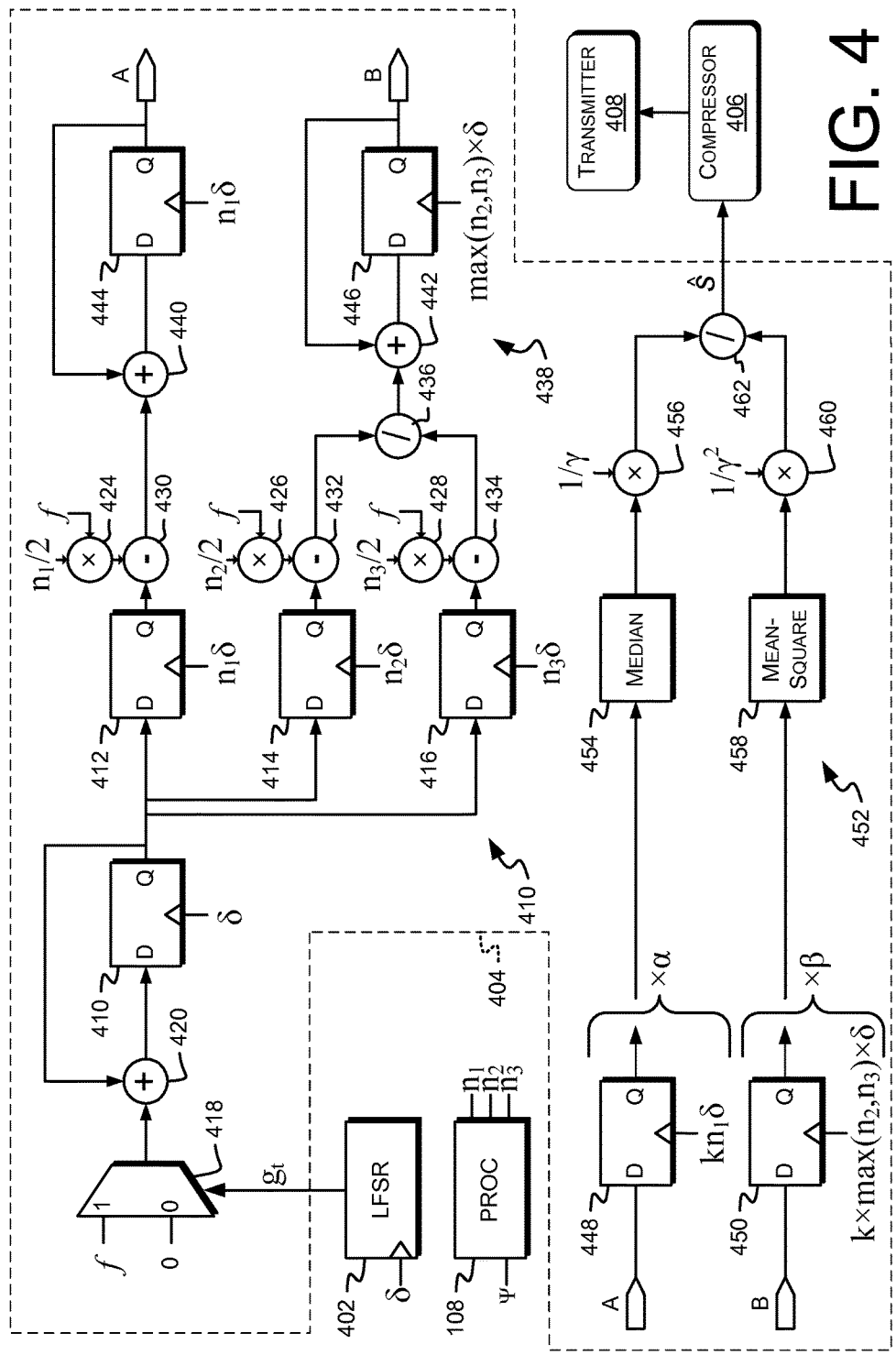
FIG. 4 illustrates an example implementation of sparsity estimation in accordance with various embodiments.

FIG. 4 illustrates device 400 that implements sparsity-estimation architecture 300 on a specialized integrated circuit or a programmable integrated circuit in accordance with various embodiments. In this figure, "δ" denotes the clock. Flip-flop clock inputs labeled with multiples of δ, e.g., $n_1 \delta$ or $n_1 \times \delta$, signify that the flip-flop is enabled and thus stores a new value once every $n_1$ clock cycles.

The device 400 includes a bit-sequence generator 402 configured to provide a sequence of bits $g_t$ in which each successive bit has a substantially equal probability of being a 0 bit or a 1 bit, e.g., as described above. In the example shown, the bit-sequence generator 402 includes a linear feedback shift register (LFSR). The LFSR includes an arrangement of flip-flops and XOR or exclusive-nor (XNOR) gates configured to provide a pseudorandom bit sequence having p≈0.5 as discussed above. Using an LFSR in bit-sequence generator 402 advantageously provides (pseudo-) random values at much lower energy cost than measuring physical sources of randomness or of generating random values from a complex distribution.

The device 400 also includes a sparsity estimator 404 configured to estimate a sparsity value $\hat{s}$ of a data sequence based at least in part on the sequence of bits and a plurality of samples of the data sequence. The sparsity estimator 404 is described in more detail below.

A compressor 406 may be configured to compress the data sequence based at least in part on the estimated sparsity value. The compressor 406 may represent the compression module 212, FIG. 2. A transmitter 408 may be configured to transmit the compressed data sequence. The transmitter 408 may represent the transmitting module 214 and the transmitter 204, FIG. 2.

In some examples, the sparsity estimator 404 includes a first plurality 410 of accumulators configured to determine respective inner products of the sequence of bits with respective values f of the data sequence. The first plurality 410 includes D flip-flops (DFFs) 412, 414, and 416 that latch when $n_1$, $n_2$, and $n_3$ cycles of clock δ, respectively, have elapsed. The inner products are computed by multiplexer (mux) 418, adder 420, and DFF 422. The mux 418 outputs the product of the current sample f of the sensor data with the current bit $g_t$ of the bit sequence. The adder 420 adds that product to the sum stored in DFF 422, which then latches the updated sum. The outputs of DFFs 412, 414, and 416 may be, for example, elements of distribution vectors per Eqs. (5)-(9), except with the offset of the mean described above with reference to Eq. (4). Multipliers 424, 426, and 428 and subtractors 430, 432, and 434 remove the mean offset from DFFs 412, 414, and 416 to form the elements of the distribution vectors. Each multiplier 424, 426, 428 provides the product of the current sample f and half of the respective count ($n_1$, $n_2$, $n_3$). In some examples, values for the counts (e.g., $n_1$, $n_2$, $n_3$) are rounded to the nearest power of 2. This permits multipliers 424, 426, 428 to shift rather than multiplying, which may further reduce power consumption and increase processing speed. Each subtractor 430, 432, 434 removes the respective product from the output of the respective DFF 412, 414, and 416. The outputs of subtractor 430 are the elements of the distribution vectors $\vec{d}_k$. Divider 436 forms the quotient of the output of subtractor 432 and the output of subtractor 434 to form the elements of the distribution vectors $\vec{c}_k$.

Specifically, in some examples, the first plurality 410 of accumulators includes first, second, and third accumulators (including DFFs 412, 414, and 416, respectively, and subtractors 430, 432, 434, respectively) and the device 400 further includes a divider 436 configured to output a quotient of the output of the second accumulator and the output of the third accumulator.

A second plurality 438 of accumulators may be configured to accumulate selected ones of the respective inner products to provide respective test values, e.g., test vectors $\vec{y}$ and $\vec{z}$. The second plurality 438 includes adders 440 and 442 connected in a loop with DFFs 444 and 446 to sum successive outputs from subtractor 430 and divider 436, respectively. DFFs 448 and 450 then latch the sums from DFFs 444, 446, respectively, once the values of each distribution vector have been accumulated. The outputs from DFFs 448, 450 are respective test values $y_k$ and $z_k$. As indicated by the curly braces labeled "×α" and "×β," α y values and β z values are computed, e.g., using multiple pluralities 410, 438 of accumulators arranged in parallel, using registers (e.g., a first-in-first-out, FIFO, buffer) to store sequentially-computed y and z values, or a combination thereof.

Specifically, in some examples, the second plurality 438 of accumulators includes fourth and fifth accumulators (including DFFs 444, 446, respectively), the fourth accumulator may be coupled to the first accumulator, and the fifth accumulator may be coupled to an output of the divider 436.

A plurality 452 of summarizing units are configured to provide respective scale factors $T_1$, $T_2$ based at least in part on the respective test values from respective ones of the plurality 438 of second accumulators. The illustrated plurality 452 includes median unit 454 and multiplier 456, which together may implement Eq. (12), and mean-square unit 458 and multiplier 460, which together may implement Eq. (13). Divider 462 divides the output of multiplier 456 by the output of multiplier 460 to provide the estimated sparsity value ŝ of the data sequence, e.g., per Eq. (14), to the compressor 406.

Specifically, in some examples, the plurality 452 of summarizing units includes a median-computation unit (including median unit 454) coupled to the output of the fourth accumulator and a mean-square computation unit (including mean-square unit 458) coupled to the output of the fifth accumulator.

In some examples, processing unit 108 may be configured to receive a projection basis Ψ of the data sequence and determine respective counts for each of the accumulators of the first plurality 410 of accumulators based at least in part on the projection basis Ψ. In these examples, each accumulator of the first plurality 410 of accumulators may be configured to accumulate a number of the samples of the data sequence equal to the determined respective count. The accumulators may reset or hold value after reaching the determined respective count.

Example System

Figure 5:
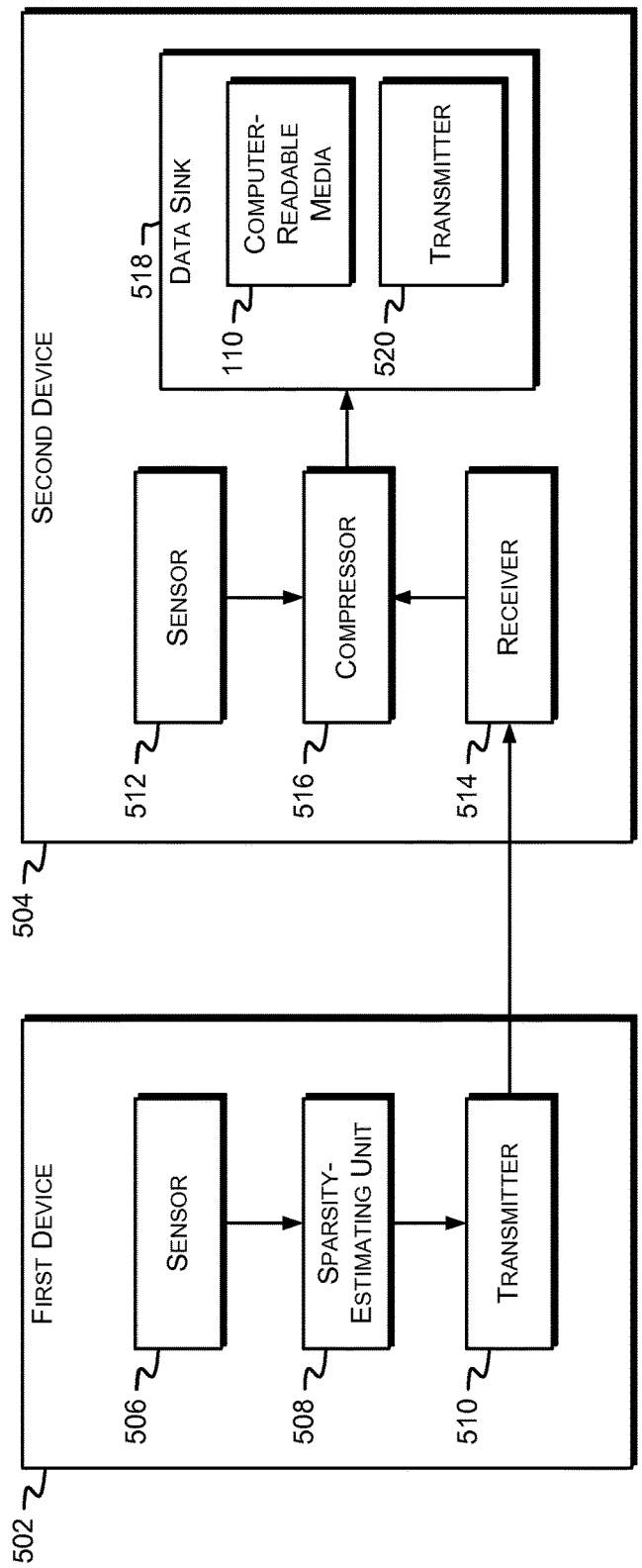
FIG. 5 illustrates a system configured for sparsity estimation and data compression in accordance with various embodiments.

FIG. 5 illustrates system 500 configured for sparsity estimation and data compression. The system 500 includes a first device 502 and a second device 504. The devices 502, 504 may represent electronic devices 102, FIG. 1. The first device 502 may include a first sensor 506, which may represent a sensor 126, FIG. 1. The first device 502 may also include a sparsity-estimating unit 508 configured to estimate a sparsity value of first sensor data from the first sensor 506 and a transmitter 510 configured to transmit the estimated sparsity value. The second device 504 may include a second sensor 512, a receiver 514 configured to receive the estimated sparsity value from the transmitter 510 of the first device 502, a compressor 516 configured to compress second sensor data from the second sensor 512 based at least in part on the received estimated sparsity value, a data sink 518 configured to receive the compressed second sensor data. The data sink 518 may include, e.g., computer-readable media 110 configured to store the compressed second sensor data or a second transmitter 520 configured to transmit the compressed sensor data.

For the second device 504 to use the sparsity estimated by the sparsity-estimating unit 508 provides the second device 504 the advantages of lower energy consumption and bandwidth utilization described above with reference to sparsity estimation and data compression based on the estimated sparsity. Using the receiver 514 to receive the estimated sparsity further reduces energy consumption of the second device 504. In some examples, the first device 502 transmits the estimated sparsity to multiple second devices 504, further reducing amortized energy consumption of the sparsity estimation while providing reduced energy and bandwidth usage to each of the second devices 504.

In some examples, each of the first sensor 506 and the second sensor 512 includes an environmental sensor. Example environmental sensors include temperature sensors, humidity sensors, ambient-light sensors, and wind sensors. Each of the first device 502 and the second device 504 may be configured for indoor use, outdoor use, or both. Since different types of weather measurement tend to be correlated (e.g., temperature and humidity both rise on a summer afternoon), the sparsity of humidity data is likely to be similar to the sparsity of temperature data. Consequently, the same estimated sparsity value ŝ may be used to compress data from both of the sensors 506, 512.

In some examples, each of the first sensor 506 and the second sensor 512 includes an ECG sensor for a particular ECG trace of a patient's heart. Since ECG traces (sometimes referred to as "leads") tend to be correlated, the sparsity of one trace is likely to be similar to the sparsity of another trace. In some examples, one or more sensor(s) or sensing device(s) may provide two or more channels of sensor data, e.g., correlated sensor data. For example, an ECG sensor device may provide two or more channels of correlated ECG traces.

In some examples, the sparsity-estimating unit 508 may be configured to estimate the sparsity value of the first sensor data by determining a plurality of bits, in which each bit has a substantially equal probability of being determined as a 0 bit or of being determined as a 1 bit. This may be done, e.g., as described above with reference to bit-sequence generator 402, e.g., including a linear feedback shift register. The sparsity-estimating unit 508 may be further configured to determine a plurality of test statistics such as scales $T_1$ and $T_2$ based at least in part on the plurality of bits and the first sensor data, e.g., as described above with reference to FIG. 4. The sparsity-estimating unit 508 may be further configured to combine the test statistics to provide the estimated sparsity value ŝ, e.g., as described above with reference to divider 462, FIG. 4.

In some examples, the sparsity-estimating unit 508 may be configured to determine each of the plurality of test statistics using a respective number of the bits, and to determine the respective numbers of the bits based at least in part on a projection basis (e.g., Ψ) of the sensor data. This may be done as discussed above with reference to functions of processing unit 108 shown in FIG. 4.

Example Processes

Figure 6:
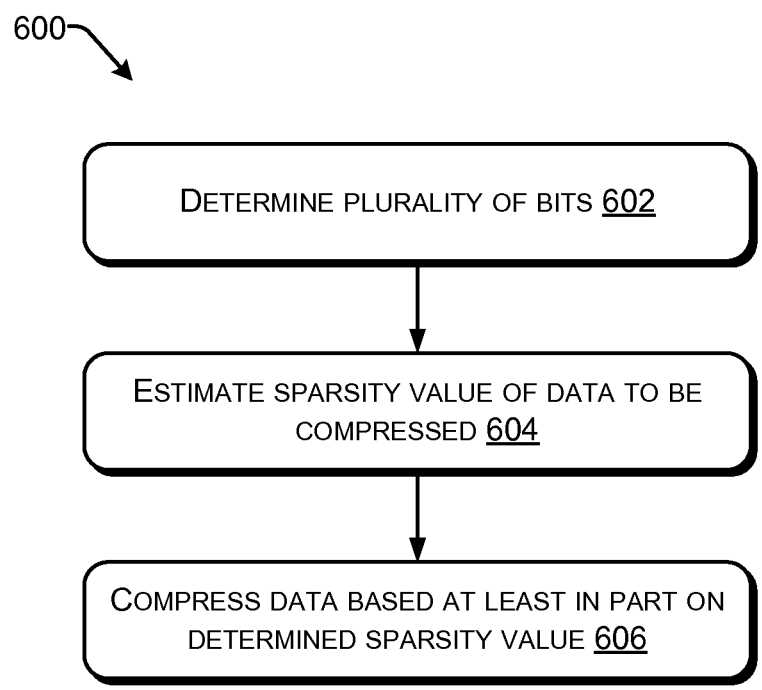
FIG. 6 depicts a flow graph that shows an example process of compressing data, in accordance with various embodiments.

FIG. 6 depicts a flow graph that shows an example process 600 of compressing data, in accordance with various embodiments. At 602, a plurality of bits may be determined, in which each individual bit has a substantially equal probability of being determined as a 0 bit or of being determined as a 1 bit. This may be done as discussed above with reference to bitstream module 208, FIG. 2. For example, an LFSR or other pseudorandom bit generator can be operated to determine the bits.

At 604, a sparsity value of data to be compressed may be estimated based at least in part on the plurality of bits. This may be done as described above with reference to sparsity-estimation module 210, FIG. 2. For example, the sparsity value may be estimated by using the determined bits to select values corresponding to statistical distributions such as Cauchy or Gaussian and optionally corresponding to a basis in which the data to be compressed are sparse. These selected values may be combined with samples from the data to be compressed to determine test values. A plurality of test values for each of a plurality of distributions may be used to determine a sparsity value of the data to be compressed.

At 606, the data may be compressed based at least in part on the determined sparsity value to provide compressed data. This may be done as described above with reference to compression module 212, FIG. 2. For example, a vector the data to be compressed may be transformed by a compression matrix to produce a compressed-data vector. The compression matrix may have a sized determined based at least in part on the determined sparsity value.

Figure 7:
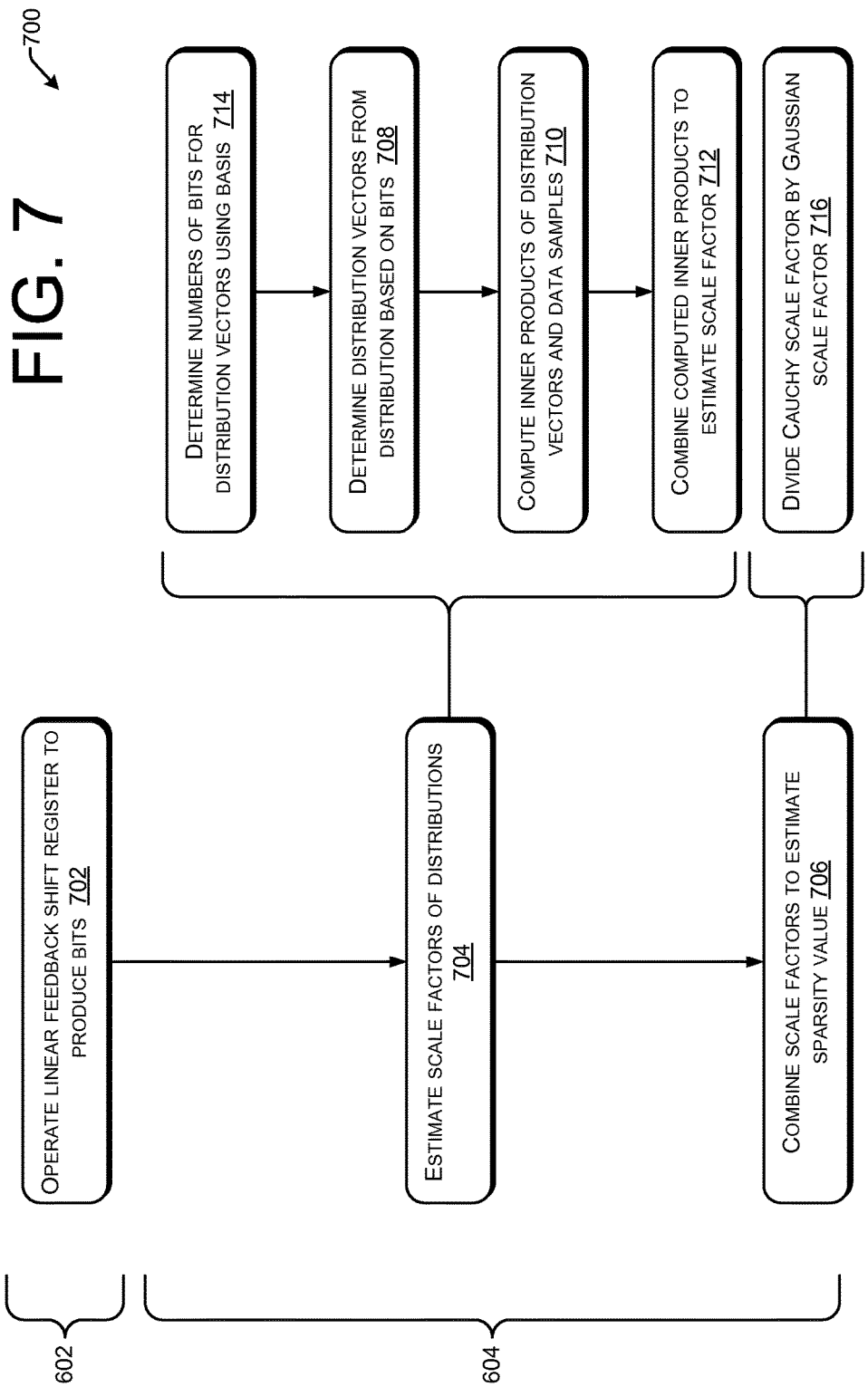
FIG. 7 depicts a flow graph that shows an example process of compressing data, in accordance with various embodiments.

FIG. 7 depicts a flow graph that shows an example process 700 of compressing data, in accordance with various embodiments. At 702, which may be part of block 602, a linear feedback shift register (LFSR) may be operated to produce successive ones of the plurality of bits. This may be done, e.g., as described above with reference to bit-sequence generator 402, FIG. 4. For example, bits may be shifted through a shift register, and the input of the shift register determined as an XOR of certain ones of the bits in the shift register.

At 704, which may be part of block 604, a respective scale factor of each of a plurality of distributions may be estimated based at least in part on the plurality of bits and the data to be compressed. In some examples, the estimating the scale factor for a selected distribution of the plurality of distributions (block 704) comprises one or more of blocks 706, 708, 710, and 712.

At 706, a plurality of distribution vectors is determined from the selected distribution based at least in part on the plurality of bits. This may be done, e.g., as described above with reference to accumulators 306, 308, FIG. 3. For example, a number of bits may be determined, e.g., using a basis $\Psi$ and the selected distribution, and that number of bits may be summed to produce a single sample from the selected distribution. A desired number of such samples may be produced for each distribution vector.

At 708, inner products of the distribution vectors and corresponding samples of the data to be compressed are computed. This may be done, e.g., as described above with reference to test-value generation units 310, 312. For example, successive samples of the data to be compressed may be multiplied by successive elements of one of the distribution vectors, and the products summed to form an inner product. The same may be done for each of the distribution vectors to produce a respective inner product.

At 710, the computed inner products are combined to estimate the scale factor for the selected distribution. This may be done, e.g., as described above with reference to scale-factor-determining units 314, 316. For example, for a Cauchy distribution, the median of the inner products may be computed. For a Gaussian distribution, the mean of squares of the inner products may be computed. In some examples, computations described in Eqs. (12) and (13) may be performed.

At 712, the estimating the scale factor for a selected distribution of the plurality of distributions further comprises determining a respective number of bits for each of the plurality of distribution vectors based at least in part on a projection basis (e.g., $\Psi$) of the sensor data. This may be done, e.g., as described above with reference to functions of processing unit 108 shown in FIG. 4. For example, computations described in Eqs. (6), (7), and (9) may be performed.

At 714, which may be part of block 604, the sparsity value may be estimated by combining the determined respective scale factors.

Block 716 may be useful in examples in which the plurality of distributions comprises a Cauchy distribution and a Gaussian distribution. At 716, the estimating the sparsity value (block 714) comprises dividing the estimated scale factor of the Cauchy distribution by the estimated scale factor of the Gaussian distribution. This division operation is further described above with reference to divider 462, FIG. 4.

The operations of the example processes of FIGS. 6 and 7 are illustrated in individual blocks and summarized with reference to those blocks. The order in which the operations are described is not intended to be construed as a limitation, and any number of the described operations may be combined in any order, separated into sub-operations, and/or performed in parallel to implement the process. Processes according to various embodiments of the present disclosure may include only some or all of the operations depicted in the logical flow graph.

Example Clauses

A. A system, comprising: a first device including: a first sensor; a sparsity-estimating unit configured to estimate a sparsity value of first sensor data from the first sensor; and a transmitter configured to transmit the estimated sparsity value; and a second device including: a second sensor; a receiver configured to receive the estimated sparsity value from the transmitter of the first device; a compressor configured to compress second sensor data from the second sensor based at least in part on the received estimated sparsity value; and a data sink configured to receive the compressed second sensor data.

B. The system of paragraph A, wherein the data sink includes a computer storage medium configured to store the compressed second sensor data or a second transmitter configured to transmit the compressed sensor data.

C. The system of paragraph A or B, wherein each of the first sensor and the second sensor includes an environmental sensor, e.g., a temperature sensor or a humidity sensor.

D. The system of any of paragraphs A-C, wherein the sparsity-estimating unit is configured to estimate the sparsity value of the first sensor data by: determining a plurality of bits, in which each bit has a substantially equal probability of being determined as a 0 bit or of being determined as a 1 bit; determining a plurality of test statistics based at least in part on the plurality of bits and the first sensor data; and combining the test statistics to provide the estimated sparsity value.

E. The system of paragraph D, wherein the sparsity-estimating unit is further configured to determine each of the plurality of test statistics using a respective number of the bits and to determine the respective numbers of the bits based at least in part on a projection basis of the sensor data.

F. A method, comprising: estimating a sparsity value of first sensor data from a first sensor of a first device; transmitting the estimated sparsity value to a second device; and compressing second sensor data from a second sensor of the second device based at least in part on the received estimated sparsity value.

G. The method of paragraph F, further comprising storing the compressed second sensor data, e.g., on a computer storage medium, or transmitting the compressed sensor data.

H. The method of paragraph F or G, wherein each of the first sensor and the second sensor includes an environmental sensor, e.g., a temperature sensor or a humidity sensor.

I. The method of any of paragraphs F-H, wherein the estimating the sparsity value of the first sensor data includes determining a plurality of bits, in which each bit has a substantially equal probability of being determined as a 0 bit or of being determined as a 1 bit; determining a plurality of test statistics based at least in part on the plurality of bits and the first sensor data; and combining the test statistics to provide the estimated sparsity value.

J. The method of paragraph I, wherein the estimating the sparsity value of the first sensor data further includes determining each of the plurality of test statistics using a respective number of the bits and determining the respective numbers of the bits based at least in part on a projection basis of the sensor data.

K. The method of any of paragraphs F-J, further including receiving, at the second device, the estimated sparsity value from the transmitter of the first device.

L: A computer-readable medium having thereon computer-executable instructions, the computer-executable instructions upon execution configuring a computer to perform operations as any of paragraphs F-K recites.

M. A system, comprising: means for estimating a sparsity value of first sensor data from a first sensor of a first device; means for transmitting the estimated sparsity value to a second device; and means for compressing second sensor data from a second sensor of the second device based at least in part on the received estimated sparsity value.

N. The system of paragraph M, further comprising means for storing the compressed second sensor data, e.g., on a computer storage medium, or means for transmitting the compressed sensor data.

O. The system of paragraph M or N, wherein each of the first sensor and the second sensor includes an environmental sensor, e.g., a temperature sensor or a humidity sensor.

P. The system of any of paragraphs M-O, wherein the means for estimating the sparsity value of the first sensor data includes means for determining a plurality of bits, in which each bit has a substantially equal probability of being determined as a 0 bit or of being determined as a 1 bit; means for determining a plurality of test statistics based at least in part on the plurality of bits and the first sensor data; and means for combining the test statistics to provide the estimated sparsity value.

Q. The system of paragraph P, wherein the means for estimating the sparsity value of the first sensor data further includes means for determining each of the plurality of test statistics using a respective number of the bits and means for determining the respective numbers of the bits based at least in part on a projection basis of the sensor data.

R. The system of any of paragraphs M-Q, further including means for receiving, at the second device, the estimated sparsity value from the transmitter of the first device.

S: A device comprising: a sensor configured to output sensor data corresponding to at least one physical property; a transmitter; one or more processing unit(s) coupled to the sensor and the transmitter; one or more computer storage media; and one or more program modules stored on the one or more computer storage media and executable by the one or more processing unit(s) to: receive a plurality of samples of the sensor data from the sensor; determine a plurality of bits, in which each bit has a substantially equal probability of being determined as a 0 bit or of being determined as a 1 bit; estimate a sparsity value of the sensor data based at least in part on the sequence of bits and the sensor data; compress the received samples of the sensor data based at least in part on the determined sparsity value to provide compressed data; and transmit the compressed data via the transmitter to a receiver.

T: The device of paragraph S, wherein the one or more program modules are further executable by the one or more processing unit(s) to determine a number of bits to represent the compressed data based at least in part on the estimated sparsity value of the sensor data, and wherein the determined number of bits is positively correlated with the estimated sparsity value.

U: The device of paragraph S or T, wherein the at least one physical property includes a physical property of the device or an environment of the device.

V: The device of any of paragraphs S-U, wherein the one or more program modules are further executable by the one or more processing unit(s) to estimate the sparsity value of the sensor data by: estimating a respective scale factor of each of a plurality of distributions based at least in part on the plurality of bits and the sensor data; and estimating the sparsity value by combining the determined respective scale factors.

W: The device of paragraph V, wherein the plurality of distributions comprises a Cauchy distribution and a Gaussian distribution and the one or more program modules are further executable by the one or more processing unit(s) to combine the determined respective scale factors by dividing the determined scale factor of the Cauchy distribution by the determined scale factor of the Gaussian distribution.

X: The device of paragraph V or W, wherein the one or more program modules are further executable by the one or more processing unit(s) to estimate the respective scale factor of a selected distribution of the plurality of distributions by: determining a plurality of distribution vectors from the selected distribution based at least in part on the plurality of bits; selecting one or more data vector(s) from the received samples of the sensor data; determining a respective test value for each of the plurality of distribution vectors based at least in part on one of the one or more data vector(s); and estimating the scale factor by combining the determined respective test values.

Y: The device of paragraph X, wherein the one or more program modules are further executable by the one or more processing unit(s) to determine the plurality of bits using a linear feedback shift register.

Z: The device of paragraph X or Y, wherein the one or more program modules are further executable by the one or more processing unit(s) to determine a plurality of elements of each of the plurality of distribution vectors by summing one or more of the plurality of bits.

AA: The device of any of paragraphs X-Z, wherein the one or more program modules are further executable by the one or more processing unit(s) to sum the one or more of the plurality of bits by determining a respective number of the bits for each of the plurality of distribution vectors based at least in part on a projection basis of the sensor data, and summing the determined number of the bits.

AB: A device, comprising: a bit-sequence generator configured to provide a sequence of bits in which each successive bit has a substantially equal probability of being a 0 bit or a 1 bit; a sparsity estimator configured to estimate a sparsity value of a data sequence based at least in part on the sequence of bits and a plurality of samples of the data sequence; a compressor configured to compress the data sequence based at least in part on the estimated sparsity value; and a transmitter configured to transmit the compressed data sequence.

AC: The device of paragraph AB, wherein the bit-sequence generator includes a linear feedback shift register.

AD: The device of paragraph AB or AC, wherein the sparsity estimator includes: a first plurality of accumulators configured to determine respective inner products of the sequence of bits with respective values of the data sequence; a second plurality of accumulators configured to accumulate selected ones of the respective inner products to provide respective test values; and a plurality of summarizing units configured to provide respective scale factors based at least in part on the respective test values from respective ones of the plurality of second accumulators.

AE: The device of paragraph AD, wherein the first plurality of accumulators includes first, second, and third accumulators, the device further includes a divider configured to output a quotient of the output of the second accumulator and the output of the third accumulator, the second plurality of accumulators includes fourth and fifth accumulators, the fourth accumulator is coupled to the first accumulator, the fifth accumulator is coupled to an output of the divider, and the plurality of summarizing units includes a median-computation unit coupled to the output of the fourth accumulator and a mean-square computation unit coupled to the output of the fifth accumulator.

AF: The device of paragraph AD or AE, further including a processing unit configured to receive a projection basis of the data sequence and determine respective counts for each of the accumulators of the first plurality of accumulators based at least in part on the projection basis, wherein each accumulator of the first plurality of accumulators is configured to accumulate a number of the samples of the data sequence equal to the determined respective count.

AG: A data-compression method, comprising: determining a plurality of bits, in which each individual bit has a substantially equal probability of being determined as a 0 bit or of being determined as a 1 bit; estimating a sparsity value of data to be compressed based at least in part on the plurality of bits; and compressing the data based at least in part on the determined sparsity value to provide compressed data.

AH: The method of paragraph AG, wherein the determining comprises operating a linear feedback shift register that produces successive ones of the plurality of bits.

AI: The method of paragraph AG or AH, wherein the estimating comprises: estimating a respective scale factor of each of a plurality of distributions based at least in part on the plurality of bits and the data to be compressed; and estimating the sparsity value by combining the determined respective scale factors.

AJ: The method of paragraph AI, wherein the estimating the scale factor for a selected distribution of the plurality of distributions comprises: determining a plurality of distribution vectors from the selected distribution based at least in part on the plurality of bits; computing inner products of the distribution vectors and corresponding samples of the data to be compressed; and combining the computed inner products to estimate the scale factor for the selected distribution.

AK: The method of paragraph AJ, wherein the estimating the scale factor for a selected distribution of the plurality of distributions further comprises determining a respective number of bits for each of the plurality of distribution vectors based at least in part on a projection basis of the sensor data.

AL: The method of any of paragraphs AI-AK, wherein the plurality of distributions comprises a Cauchy distribution and a Gaussian distribution and the estimating the sparsity value comprises dividing the estimated scale factor of the Cauchy distribution by the estimated scale factor of the Gaussian distribution.

AM: A computer-readable medium having thereon computer-executable instructions, the computer-executable instructions upon execution configuring a computer to perform operations as any of paragraphs AG-AL recites.

AN: A data-compression system, comprising: means for determining a plurality of bits, in which each individual bit has a substantially equal probability of being determined as a 0 bit or of being determined as a 1 bit; means for estimating a sparsity value of data to be compressed based at least in part on the plurality of bits; and means for compressing the data based at least in part on the determined sparsity value to provide compressed data.

AO: The system of paragraph AN, wherein the means for determining comprises means for operating a linear feedback shift register that produces successive ones of the plurality of bits.

AP: The system of paragraph AN or AO, wherein the means for estimating comprises: means for estimating a respective scale factor of each of a plurality of distributions based at least in part on the plurality of bits and the data to be compressed; and means for estimating the sparsity value by combining the determined respective scale factors.

AQ: The system of paragraph AP, wherein the means for estimating the scale factor for a selected distribution of the plurality of distributions comprises: means for determining a plurality of distribution vectors from the selected distribution based at least in part on the plurality of bits; means for computing inner products of the distribution vectors and corresponding samples of the data to be compressed; and means for combining the computed inner products to estimate the scale factor for the selected distribution.

AR: The system of paragraph AQ, wherein the means for estimating the scale factor for a selected distribution of the plurality of distributions further comprises means for determining a respective number of bits for each of the plurality of distribution vectors based at least in part on a projection basis of the sensor data.

AS: The system of any of paragraphs AP-AR, wherein the plurality of distributions comprises a Cauchy distribution and a Gaussian distribution and the means for estimating the sparsity value comprises means for dividing the estimated scale factor of the Cauchy distribution by the estimated scale factor of the Gaussian distribution.

AT: A data-compression method, comprising: determining a plurality of bits, in which each individual bit has a substantially equal probability of being determined as a 0 bit or of being determined as a 1 bit; estimating a sparsity value of first data based at least in part on the plurality of bits; and compressing second, different data based at least in part on the determined sparsity value to provide compressed data.

AU: The method of paragraph AT, wherein the first data and the second data are correlated.

AV: The method of paragraph AT or AU, further including receiving the first data and the second data from a sensing device as respective channels of data.

AW: A computer-readable medium having thereon computer-executable instructions, the computer-executable instructions upon execution configuring a computer to perform operations as any of paragraphs AT-AV recites.

AX: A system, comprising: means for determining a plurality of bits, in which each individual bit has a substantially equal probability of being determined as a 0 bit or of being determined as a 1 bit; means for estimating a sparsity value of first data based at least in part on the plurality of bits; and means for compressing second, different data based at least in part on the determined sparsity value to provide compressed data.

AY: The system of paragraph AX, wherein the first data and the second data are correlated.

AZ: The system of paragraph AX or AY, further including means for receiving the first data and the second data from a sensing device as respective channels of data.

BA: A device, comprising: a first sensor configured to output a first sensor data sequence; a second sensor configured to output a second sensor data sequence; a bit-sequence generator configured to provide a sequence of bits in which each successive bit has a substantially equal probability of being a 0 bit or a 1 bit; a sparsity estimator configured to estimate a sparsity value of the first sensor data sequence based at least in part on the sequence of bits and a plurality of samples of the first sensor data sequence; and a compressor configured to compress the second sensor data sequence based at least in part on the estimated sparsity value.

BB: The device of paragraph BA, further including a transmitter configured to transmit the compressed data sequence.

BC: The device of paragraph BA or BB, wherein the first sensor data sequence corresponds to at least one physical property and the second sensor data sequence corresponds to at least one physical property.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A device comprising:
   a sensor configured to output sensor data corresponding to at least one physical property;
   a transmitter;
   one or more processing unit(s) coupled to the sensor and the transmitter;
   one or more computer storage media; and
   one or more program modules stored on the one or more computer storage media and executable by the one or more processing unit(s) to:
   receive a plurality of samples of the sensor data from the sensor;
   determine a plurality of bits based on the plurality of sample of the sensor data, in which each bit has a substantially equal probability of being determined as a 0 bit or of being determined as a 1 bit;
   estimate a sparsity value of the sensor data based at least in part on the sequence of bits and the sensor data by estimating a respective scale factor of each of a plurality of distributions based at least in part on the plurality of bits and the sensor data and combining the estimated respective scale factors to determine the sparsity value;
   compress the received samples of the sensor data based at least in part on the determined sparsity value to provide compressed data; and
   transmit the compressed data via the transmitter to a receiver.

2. The device of claim 1, wherein the one or more program modules are further executable by the one or more processing unit(s) to determine a number of bits to represent the compressed data based at least in part on the estimated sparsity value of the sensor data, and wherein the determined number of bits is positively correlated with the estimated sparsity value.

3. The device of claim 1, wherein the at least one physical property includes a physical property of the device or an environment of the device.

4. The device of claim 1, wherein the plurality of distributions comprises a Cauchy distribution and a Gaussian distribution and the one or more program modules are further executable by the one or more processing unit(s) to combine the determined respective scale factors by dividing the determined scale factor of the Cauchy distribution by the determined scale factor of the Gaussian distribution.

5. The device of claim 1, wherein the one or more program modules are further executable by the one or more processing unit(s) to estimate the respective scale factor of a selected distribution of the plurality of distributions by:
   determining a plurality of distribution vectors from the selected distribution based at least in part on the plurality of bits;
   selecting one or more data vector(s) from the received samples of the sensor data;
   determining a respective test value for each of the plurality of distribution vectors based at least in part on one of the one or more data vector(s); and
   estimating the scale factor by combining the determined respective test values.

6. The device of claim 5, wherein the one or more program modules are further executable by the one or more processing unit(s) to determine the plurality of bits using a linear feedback shift register.

7. The device of claim 5, wherein the one or more program modules are further executable by the one or more processing unit(s) to determine a plurality of elements of each of the plurality of distribution vectors by summing one or more of the plurality of bits.

8. The device of claim 5, wherein the one or more program modules are further executable by the one or more processing unit(s) to sum the one or more of the plurality of bits by determining a respective number of the bits for each of the plurality of distribution vectors based at least in part on a projection basis of the sensor data, and summing the determined number of the bits.

9. A device, comprising:
   a connection for a battery, wherein the device is powered by the battery;
   a circuit comprising at least one of a specialized integrated circuit, a programmable integrated circuit, or a programmable logic device;
   a bit-sequence generator of the circuit, the bit-sequence generator configured to provide a sequence of bits in which each successive bit has a substantially equal probability of being a 0 bit or a 1 bit;
   a sparsity estimator configured to estimate a sparsity value of a data sequence based at least in part on the sequence of bits and a plurality of samples of the data sequence by estimating a respective scale factor of each of a plurality of distributions based at least in part on the plurality of bits and the plurality of samples of the data sequence and combining the estimated respective scale factors to determine the sparsity value;

a compressor configured to compress the data sequence based at least in part on the estimated sparsity value; and a transmitter configured to transmit the compressed data sequence.

10. The device of claim 9, wherein the bit-sequence generator includes a linear feedback shift register.

11. The device of claim 9, wherein the sparsity estimator includes:

a first plurality of accumulators configured to determine respective inner products of the sequence of bits with respective values of the data sequence;

a second plurality of accumulators configured to accumulate selected ones of the respective inner products to provide respective test values; and a plurality of summarizing units configured to provide the respective scale factors based at least in part on the respective test values from respective ones of the plurality of second accumulators.

12. The device of claim 11, wherein the first plurality of accumulators includes first, second, and third accumulators, the device further includes a divider configured to output a quotient of the output of the second accumulator and the output of the third accumulator, the second plurality of accumulators includes fourth and fifth accumulators, the fourth accumulator is coupled to the first accumulator, the fifth accumulator is coupled to an output of the divider, and the plurality of summarizing units includes a median-computation unit coupled to the output of the fourth accumulator and a mean-square computation unit coupled to the output of the fifth accumulator.

13. The device of claim 11, further including a processing unit configured to receive a projection basis of the data sequence and determine respective counts for each of the accumulators of the first plurality of accumulators based at least in part on the projection basis, wherein each accumulator of the first plurality of accumulators is configured to accumulate a number of the samples of the data sequence equal to the determined respective count.

14. A data-compression method, comprising:

receiving a plurality of samples of sensor data from a sensor configured to output sensor data corresponding to at least one physical property;

determining a plurality of bits based on the plurality of samples of the sensor data, in which each individual bit has a substantially equal probability of being determined as a 0 bit or of being determined as a 1 bit;

estimating a sparsity value of data to be compressed based at least in part on the plurality of bits by estimating a respective scale factor of each of a plurality of distributions based at least in part on the plurality of bits and the data to be compressed and combining the estimated respective scale factors to determine the sparsity value; and compressing the data based at least in part on the determined sparsity value to provide compressed data.

15. The method of claim 14, wherein the determining comprises operating a linear feedback shift register that produces successive ones of the plurality of bits.

16. The method of claim 14, wherein the estimating the scale factor for a selected distribution of the plurality of distributions comprises:

determining a plurality of distribution vectors from the selected distribution based at least in part on the plurality of bits;

computing inner products of the distribution vectors and corresponding samples of the data to be compressed; and combining the computed inner products to estimate the scale factor for the selected distribution.

17. The method of claim 16, wherein the estimating the scale factor for a selected distribution of the plurality of distributions further comprises determining a respective number of bits for each of the plurality of distribution vectors based at least in part on a projection basis of the sensor data.

18. The method of claim 16, wherein the plurality of distributions comprises a Cauchy distribution and a Gaussian distribution and the estimating the sparsity value comprises dividing the estimated scale factor of the Cauchy distribution by the estimated scale factor of the Gaussian distribution.

19. The method of claim 16, further comprising: determine a plurality of elements of each of the plurality of distribution vectors by summing one or more of the plurality of bits.

20. The method of claim 19, further comprising:

summing the one or more of the plurality of bits by determining a respective number of the bits for each of the plurality of distribution vectors based at least in part on a projection basis of the sensor data, and summing the determined number of the bits.

* * * * *